United States Patent
Gaffiero et al.

(10) Patent No.: US 8,888,464 B2
(45) Date of Patent: Nov. 18, 2014

(54) FABRICATING PARTS WITH COMPOSITE MATERIAL REINFORCEMENT HAVING A SINGLE CROSSING LINE

(75) Inventors: Jacques Gaffiero, Paris (FR); André Amari, La Chapelle En Serval (FR); Bénédicte Rinaldi, Paris (FR); Didier Trallero, Bouffemont (FR)

(73) Assignee: Airbus Helicopters, Marignane Cedex (FR)

( * ) Notice: Subject to any disclaimer, the term of this patent is extended or adjusted under 35 U.S.C. 154(b) by 136 days.

(21) Appl. No.: 13/300,717

(22) Filed: Nov. 21, 2011

(65) Prior Publication Data
US 2012/0141288 A1 Jun. 7, 2012

(30) Foreign Application Priority Data

Dec. 3, 2010 (FR) ..................................... 10 04713

(51) Int. Cl.
*B29C 70/38* (2006.01)
(Continued)

(52) U.S. Cl.
CPC ......... *B29C 70/202* (2013.01); *B29L 2031/082* (2013.01); *B29C 70/386* (2013.01); *B64C 27/473* (2013.01); *B64C 2027/4736* (2013.01)
USPC ....... 416/241 R; 428/105; 428/107; 428/113; 428/292.1; 428/332; 428/364; 428/365; 428/375; 428/378; 428/392; 428/391; 428/393; 428/394; 428/395; 428/401; 442/60; 442/179; 442/180; 442/181; 442/187; 416/229 R; 416/241 A; 416/230; 416/223 R; 156/59; 156/64; 156/166

(58) Field of Classification Search
CPC ............ B29L 2031/082; B29C 70/202; B29C 70/386; B64C 27/4736; B64C 2027/4736
USPC .............. 416/241, 241 R, 241 A, 230, 223 R, 416/229 R; 428/113, 90, 105, 107, 109, 220, 428/221, 292.1, 332, 337, 364, 365, 375, 428/378, 392–396, 401; 442/181, 60, 179, 442/180, 187, 59; 156/64, 166, 60; 224/34 R–34 A
See application file for complete search history.

(56) References Cited

U.S. PATENT DOCUMENTS 3,754,840 A * 8/1973 Zincone .......................... 416/226
5,885,059 A * 3/1999 Kovalsky et al. .............. 416/224
(Continued)

FOREIGN PATENT DOCUMENTS

EP 1035963 A1 9/2000

OTHER PUBLICATIONS

Definition of "voluntarily", Merriam-Webster, Webster's Third New International Dictionary, Unabridged, May 28, 2013, Merriam Webster.*

(Continued)

*Primary Examiner* — Arti Singh-Pandey
*Assistant Examiner* — Frank Vineis
(74) *Attorney, Agent, or Firm* — Brooks Kushman P.C.

(57) ABSTRACT

Method for fabricating a reinforcing coating for a part made of composite material. Pre-impregnated reinforcing fibers are used in the form of slivers and said slivers are laid on the part in two layers of longitudinal slivers by being placed thereon. This fabrication makes provision for using an angular orientation for the slivers of each layer respectively of 0° and of some other angle relative to said determined direction of the solid body for covering using an interlaced pattern type that gives layer crossing lines parallel to a longitudinal axis of the solid body for covering, which pattern type is selected to form interlacing patterns that limit the number of layer crossing lines along the longitudinal axis of the solid body for covering to a single line.

17 Claims, 26 Drawing Sheets

(51) Int. Cl.
*B32B 17/02* (2006.01)
*B32B 17/04* (2006.01)
*B32B 23/00* (2006.01)
*B32B 25/00* (2006.01)
*B32B 27/00* (2006.01)
*B32B 27/34* (2006.01)
*B32B 3/00* (2006.01)
*B32B 37/00* (2006.01)
*B32B 5/02* (2006.01)
*B32B 5/08* (2006.01)
*B32B 5/12* (2006.01)
*B64C 27/473* (2006.01)
*B29C 70/20* (2006.01)
*B64C 11/16* (2006.01)
*B64C 27/46* (2006.01)
*D03D 15/00* (2006.01)
*D03D 25/00* (2006.01)
*D04H 3/00* (2012.01)
*B29C 65/00* (2006.01)
*B29L 31/08* (2006.01)

(56) References Cited

U.S. PATENT DOCUMENTS

| | | |
|---|---|---|
| 6,227,805 B1 | 5/2001 | Besse |
| 2004/0074592 A1 | 4/2004 | Ashton |
| 2009/0098337 A1 | 4/2009 | Xie |

OTHER PUBLICATIONS

Definition of "thus", Merriam-Webster, Webster's Third New International Dictionary, Unabridged, May 28, 2013, Merriam Webster.*
Department of Defense Handbook, Composite Materials Handbook, vol. 3. Polymer Matrix Composites Materials Usage, Design, and Analysis, Jun. 17, 2002.*
NLR and TU Delft improve composite damage tolerance. Jun. 18, 2010 http://www.reinforcedplastics.com/view/10295/nir-and-tu-delft-improve-composite-damage-tolerance/.
Search Report and Written Opinion; Application No. FR 1004713; dated Jul. 5, 2011.

* cited by examiner

FABRICATING PARTS WITH COMPOSITE MATERIAL REINFORCEMENT HAVING A SINGLE CROSSING LINE

CROSS REFERENCE TO RELATED APPLICATIONS

The present application claims priority from French patent application FR 10/04713 filed on Dec. 3, 2010, which is incorporated by reference herein.

BACKGROUND OF THE INVENTION (1) Field of the Invention

The general technical field of the invention is fabricating parts made of composite material and in particular parts that include a reinforcing coating. Such parts are often desirable in technical applications and in particular in aviation applications, for example for airplanes, helicopters, or other aircraft.

The present invention relates more particularly to fabricating a reinforcing coating that uses "fiber-placement" technology.

(2) Description of Related Art

The term "fiber-placement" is used herein to cover both the technology that uses a winding mandrel associated with a laying arm, and also the technology of placing fibers by means of a robot arm that performs laying only.

Fiber-placement is a technology for laying fibers, slivers, rovings, or other similar reinforcing strands, whether dry or pre-impregnated with resin, on preferably convex or plane surfaces of a three-dimensional body to be covered. Such placement of reinforcing fibers on a solid surface of the body for covering is performed by applying and positioning slivers, rovings, or other similar reinforcing strands by means of a positioning device or placement head that includes at least one system for guiding fibers and applying pressure to them on the surface, such as a flexible roller fitted with a latex skid for guiding the slivers. The placement device thus serves to position the fibers on the surface by direct mechanical contact without any need for particular tension in the fibers. The placement head is itself driven by a drive system such as a robot arm or a positioning gantry, having its degree of freedom servo-controlled to match the shape of the surface of the body for covering.

The fiber-placement method thus makes it possible, in particular, to cover concave surfaces within the limit set by the size of the head, and also enables discontinuous fiber-laying operations to be performed automatically such as operations of starting, laying, or cutting reinforcement. The paths given to the fibers being laid may be very complex, but they remain limited in particular by the apparent stiffness in the plane of the sliver of the material being laid. A fiber-placement installation may be designed to have a plurality of placement heads that work simultaneously on a single part, in particular for the purpose of improving the productivity of the system.

Winding is performed on a solid body, preferably a body of revolution, and it is applied by performing helical type relative movements between the part for covering and the spool or reel of material for laying, after initially connecting one end of the fibers on the part for covering. The helical type movement is provided by a combination of at least one movement in rotation and one movement in translation, typically along an axis parallel to the axis of rotation. Additional other degrees of freedom of movement in translation or rotation are possible, depending on the complexity of the shapes for covering.

The reinforcing material is thus laid continuously and it is positioned and applied solely under the effect of tension that is controlled between the point of laying on the surface and the exit point from the system for supporting the spool of reinforcing material. This tension, and the location of the outlet point, typically constituted by an eyelet, are determined by controlling the winding machine to comply with the characteristics of the reinforcement that is to be made. The reinforcing material is thus not positioned by being applied to the surface by means of a roller or some equivalent element.

The above-described "simple" winding may also present variants that are "complex", in particular for the purpose of improving the productivity of the operation. For example, it is possible to increase the number of slivers that are wound simultaneously on the part, either by associating them with one another to form a wider or thicker sliver, or by distributing them over a plurality of locations on the part in a longitudinal direction, i.e. parallel to the axis of rotation or by distributing them in a circular manner, i.e. in a ring around the rotating part.

The braiding method, another method of laying that is somewhat similar, differs from the winding method by the fact that two groups of slivers or rovings are laid simultaneously on a solid mandrel following two groups of coaxial helical paths in opposite directions, crossing in alternation over and under one another so as to lay the reinforcement in a manner that is comparable to closed and "tubular" weaving.

The invention is thus applicable in the field of making composite-material parts by placing fibers, e.g. for the purpose of making a coating on a helicopter blade.

In the context of the present invention, the following definitions should also be taken into consideration.

The term "laying" is used to cover an operation of placing one or more slivers of composite material of a given layer on a part.

The term "layer" means a partial or total covering of the reinforcing material on a given surface of the part in a thickness that is equal to the unit thickness of the laid material, typically fibers, slivers, rovings, or other equivalent strands.

The term "number of laying operations" corresponds to the number of laying operations needed to place all of the slivers of a layer on a part.

The term "pattern" should be understood as the visible design obtained by one or more crossing lines of slivers at the surface of the coating or in the thickness of the coating, in particular when they are covered by a surface fabric, e.g. in order to facilitate a paint finishing operation.

By definition, the term "pitch" is a laying empty space between two slivers laid side by side, either consecutively or simultaneously depending on the method, and in the same direction, as measured along a direction perpendicular to the sliver laying direction, with the convention that a pitch of n corresponds to the empty space left between two slivers being equal to (n−1) times the width of the sliver.

The term "pre-impregnated sliver" should be understood as having fibers, e.g. in the form of a sliver, that prior to being placed on the part, are impregnated with a resin type matrix.

The making of coatings, e.g. on a helicopter blade, generally consists in stacking pre-impregnated woven fabric that is said to be balanced in the warp and weft directions, the fabric being arranged at ±45° relative to the pitch so as to ensure that twisting moments are taken up. In other words, this orientation serves to optimize the mechanical behavior of the blade in twisting. Such an arrangement of woven fibers presents good behavior in the event of an impact, since damage propagation is limited by the interlacing of the fibers that, by definition, is always present in a fabric that is woven. It should be observed that under such circumstances, additional orientations are needed for taking up centrifugal forces and forces due to the blade bending, e.g. 0°/90°.

The present trend is to use composite preforms that are made by fiber placing in order to improve productivity.

The making of parts by placing fibers, as obtained using placement means of the robot arm or equivalent type, generally leads to surface appearances that are similar to those of superposed unidirectional sheets, since the fiber slivers are arranged edge to edge. Such surface appearance is unsatisfactory relative to ability to withstand damage insofar as damage propagates quickly in the fiber direction.

In the event of an impact on a surface made of composite material of the unidirectional sheet type, it is found that damage is relatively large since breaks (cracks) in the impregnation resin or matrix propagate very easily between the aligned fibers, with this continuing so long as the crack does not encounter a physical obstacle.

Various documents that approach the invention are mentioned below.

The NLR document dated Jun. 16, 2010 "NLR and TU Delft improve composite damage tolerance with new APPLY fiber architecture" describes the use of crossing layers of composite materials constituting placement patterns in order to increase damage tolerance. However the patterns described are not optimized for adapting to the various impacts and strikes to which a helicopter blade or a propeller blade can be exposed.

Document US 2004/0074592 describes a composite material with multiple orientations using an impregnated resin. Tapes of filaments are impregnated with a solid or semisolid resin. The resulting material possesses a varying number of layers and orientations within a sheet of the composite material that is formed. A preform is produced to determine the load characteristics of the composite component, and the number of layers and their orientations are selected as a function of those characteristics. An offset of 90° is provided between the filaments.

Document US 2009/0098337 describes articles such as a turbine cage, that are substantially cylindrical and made of composite material. Depending on the example, several plies of unidirectional fibers are interlaced in various orientations in the range 0° to 90°, including 45°, in certain circumstances.

Document U.S. Pat. No. 6,227,805 in the name of the Applicant describes a technique for making a blade out of composite material using resin transfer molding (RTM) in which a coating for the shell, the spars, and the attachment means of the blade are constituted respectively by at least one cutout of woven fabric that includes at least two crossed plies of crossed carbon fiber woven fabric, said plies being superposed on one another so as to form a predetermined angle between them.

Document EP 1 035 963 describes an applicator and control system serving to create patterns by leaving a gap in a tape, without a clear definition of any type of pattern. One of its objects is to improve the structural performance of a composite part. The limitation associated with the fiber-placement means of the type comprising solely a robot arm, as is used for making the coatings in a female mold, is such that the resulting draping can be considered as comprising superpositions of unidirectional sheets, and therefore does not have behavior that is optimized in terms of damage tolerance.

BRIEF SUMMARY OF THE INVENTION

The present invention is defined by the claims.

The invention proposes a method of fabricating a reinforcing coating that makes it possible to overcome the above-mentioned limitations.

With this method, a reinforcing coating presents optimized tolerance to damage.

The method is adapted to various different fiber-placement techniques.

In an implementation of the invention, the method of fabricating a reinforcing coating for a composite material part makes use of pre-impregnated or dry reinforcement fibers in the form of slivers or rovings and consists in laying said slivers or rovings on the part by fiber placement. The method consists in:

using two crossed layers of longitudinal slivers;

locating the portions of the part or of the environment of the part that constitute the origin(s) for laying slivers;

determining the sliver placement directions for each of the layers relative to a determined direction of the part, and determining the laying order for each of the slivers in one of the directions in order to define at least one direction of the crossing lines of the fibers;

determining a laying empty space, referred to as the "pitch" between two slivers laid consecutively in a given direction;

for the two layers, determining the number of slivers per laying operation, the pitch of the slivers laid in each laying operation, and the number of laying operations;

establishing the order in which the laying operations are performed for each sliver in each direction; and performing the laying sequence in the order and the pitch using the established pitch in order to superpose or interlace the slivers of two successive laying operations so as to reconstitute two layers with one or more crossing lines forming particular patterns.

It is found that a ridge or crossing between two sheets constitutes a shape discontinuity that generates a barrier to damage propagation. The creation of a multitude of sheet crossings, as obtained by laying slivers in patterns, is thus particularly advantageous for improving performance in terms of tolerance to impacts and damage.

In contrast, a line of discontinuity is likely to create a limit on stiffness or mechanical strength in a direction perpendicular to the line of discontinuity. It is therefore important to control the length and the orientation of such lines so as to arrange them as well as possible, in particular for a blade coating in which the twisting force direction is oriented at ±45° relative to the longitudinal direction of the part, e.g. a blade.

It is preferable to orient the lines of discontinuity in a direction parallel to the longitudinal axis of the part, e.g. a blade. It is also preferable to limit the number or the length of such lines of discontinuity in order to avoid excessively disturbing the stiffness characteristics of the reinforcement. For example, it may be preferable and sufficient to lay only one fiber-crossing line located about halfway along the chord of the part, e.g. a blade, in a direction parallel to the longitudinal direction of the part.

Placing the slivers by particular control of the crossing lines of the layers of slivers thus makes it possible to obtain different visible placement patterns.

The method in accordance with the invention thus makes it possible to propose types of sliver placement patterns that improve the behavior of the coatings, e.g. of a part, e.g. a blade, in terms of tolerance to damage, and to do so by the particular crossings of the layers of slivers that create barriers to crack propagation.

By way of example, the method in accordance with the invention consists in using slivers or rovings of width lying in the range 6.35 millimeters (mm) to 100 mm, of thickness lying in the range 0.2 mm to 0.4 mm, and of length lying in the range 100 mm to 1000 mm. These values that are given as examples may naturally be adapted to the size of the part.

In another implementation, the method in accordance with the invention consists in using dry or pre-impregnated tapes, rovings, or fibers of glass, aramid, basalt, carbon, or other natural fibers such as fibers of flax, hemp, cotton, or silk for making the slivers.

In an implementation, the method in accordance with the invention consists in locating the portion of the part that is to constitute the origin for the laying operation in the plane of the rigging bushings of the blade and on the twisting line of the part, e.g. a blade. It is starting from this origin that the origin of each layer is located.

In an implementation, the method in accordance with the invention consists in crossing the slivers of the two layers by superposing them while selecting a pitch equal to 1, 2, 3, 4, 5, 6, 7, 8, or any integer or non-integer number of times the width of the slivers.

In another implementation, the method in accordance with the invention consists in crossing the slivers of the two layers by interlacing them, selecting a pitch equal to 1, 2, 3, 4, 6, or 8, or any integer or non-integer number of times the width of the slivers.

In an implementation, the method in accordance with the invention consists in crossing a number "x" of slivers of the first layer simultaneously with a number "x" of slivers of the second layer by interlacing them, said slivers presenting a pitch equal to "y".

In another implementation, the method in accordance with the invention consists in crossing two slivers of the first layer simultaneously with two slivers of the second layer while interlacing them, said slivers presenting a pitch equal to 2.

In another implementation, the method in accordance with the invention consists in crossing four slivers of the first layer simultaneously with four slivers of the second layer while interlacing them, said slivers presenting a pitch equal to 2.

In an implementation, the method in accordance with the invention consists in using an angular orientation for the slivers of each layer respectively of ±45° relative to a given direction of the part.

In an implementation, the method in accordance with the invention consists in using an angular orientation for the slivers of each layer, respectively at 0° and at 90° relative to a given direction of the part.

It is also possible to select layer patterns with other crossing angles.

In an implementation, the method in accordance with the invention consists in determining a spacing between the slivers of each of the layers. The pattern then presents empty spaces between the slivers at the end of laying. For this purpose, it suffices for example to select a pitch that is not an integer, e.g. equal to 1.5.

In an implementation, the method in accordance with the invention consists in selecting an interlaced pattern type that gives layer crossing lines parallel to the longitudinal axis of a blade.

In an implementation, the method in accordance with the invention consists in selecting interlacing patterns in such a manner as to limit the number of layer crossing lines along the longitudinal axis of a part, e.g. a blade, to only one.

In an implementation, the method in accordance with the invention consists in positioning said single layer crossing line on the chord of the part. For example, on a blade, this serves to limit losses of stiffness characteristics on the twist box zone.

In an implementation, the method in accordance with the invention consists in selecting patterns with crossing lines of a plurality of pairs of layers that are voluntarily mutually offset, parallel, or in two directions forming an arbitrary angle, in order to limit characteristics of stiffness in the coatings. This avoids reduced characteristics being concentrated.

The term "reduced characteristics" is used to mean a reduction in mechanical performance, in traction strength, and in stiffness in the fiber direction, for example, associated with the disturbance to the alignment of the fibers.

Such a layer offset may be obtained for example merely by offsetting the laying origin in one direction relative to the other (this may also be referred to as phase shifting).

The objects given to the invention are also achieved by a composite material part including a reinforced coating fabricated by the method as described above.

The objects given to the invention are also achieved by a blade for a main rotor of a rotorcraft or a helicopter including a reinforced coating made according to the method as specified above.

The objects given to the invention are also achieved by a blade for an anti-torque rotor of a rotorcraft or a helicopter, including a reinforced coating fabricated by the method as described above.

The objects given to the invention are also achieved by a blade for propelling an aircraft, including a reinforced coating fabricated by the method as specified above.

An advantage of the method of the in accordance with the invention lies in controlling the number and the positions of the crossing lines and the patterns as obtained thereby. This control makes it possible to improve mechanical behavior of parts provided with a reinforcing coating, and in particular to limit the propagation of cracks after an impact or damage.

Another advantage of the method in accordance with the invention lies in its suitability for application to any type of panel, shroud, spherical cap, truncated cone, etc. . . .

Another advantage of the method in accordance with the invention lies in the fact that it makes it possible to make coatings with specific sliver crossing patterns that may be selected to adapt in particular to the dimensions and/or the shapes of the part.

Another advantage of the method in accordance with the invention lies in the fact that it makes it possible to make coatings with layer crossing lines that are offset between the multiple pairs of layers making up the thickness of the part. It is important to avoid layer crossing lines being superposed between two pairs of successive layers since that could create a zone of mechanical weakness.

Thus, it is possible to mutually offset the positions of the layer crossing lines by modifying the position of the origin for placing a series in a direction relative to the underlying series in the same direction.

Thus, it is also possible to give the upper layer crossing line an orientation that is different from the direction of the under crossing line, e.g. by placing the part on a support that pivots under the installation for placing fibers.

BRIEF DESCRIPTION OF THE SEVERAL VIEW OF THE DRAWINGS

The invention and its advantages appear in greater detail from the context of the following description of implementations given by way of non-limiting illustration, and with reference to the accompanying drawings, in which.

DETAILED DESCRIPTION OF THE INVENTION

Elements that are structurally and functionally identical and that are present in more than one of the figures are given the same numerical or alphanumerical references in each of them.

The method in accordance with the invention consists in controlling the sequences with which slivers are laid by determining the position, the orientation, and the extent of layer crossing lines on a surface. The method in accordance with the invention thus makes it possible in controlled manner to reproduce different layer crossing configurations.

Figure 1:
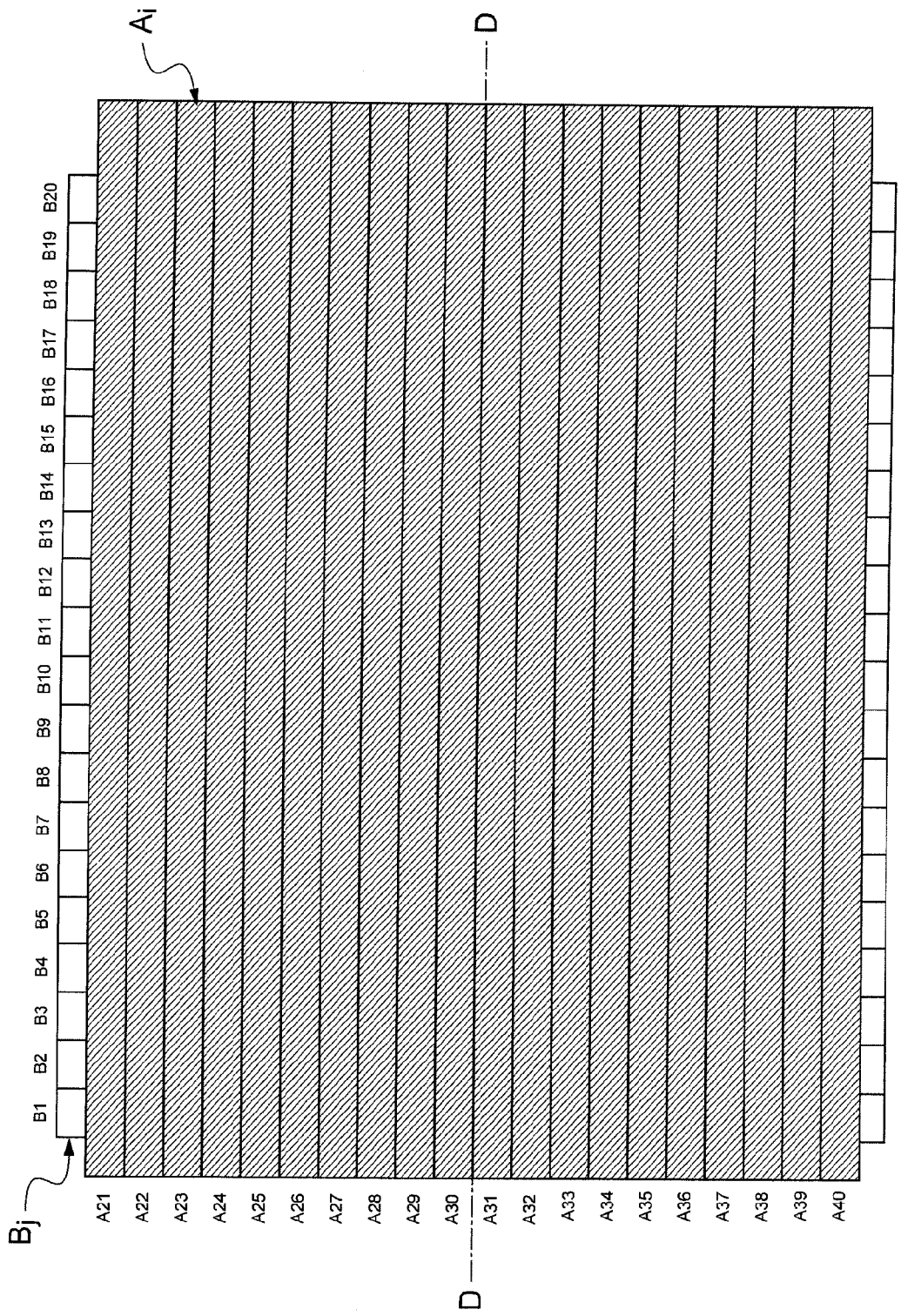
FIG. 1 shows an example of a reinforcing coating obtained by the method in accordance with the invention and comprising two superposed layers.

FIG. 1 shows an example of reinforcing coating obtained by the method in accordance with the invention. This method makes it possible to control the positions on the surface and the shapes of the layer crossing lines. The coating comprises two superposed layers A and B. Each layer A, B comprises respective slivers Ai and Bj, where i and j are integers. The slivers Ai and Bj present a pitch of 1 and they are oriented respectively at 0° and at 90° relative to a direction D. Touching slivers A21 to A40 are thus parallel to the direction D and they cover touching slivers B1 to B20 that are shown as being orthogonal to the direction D.

Figure 2:
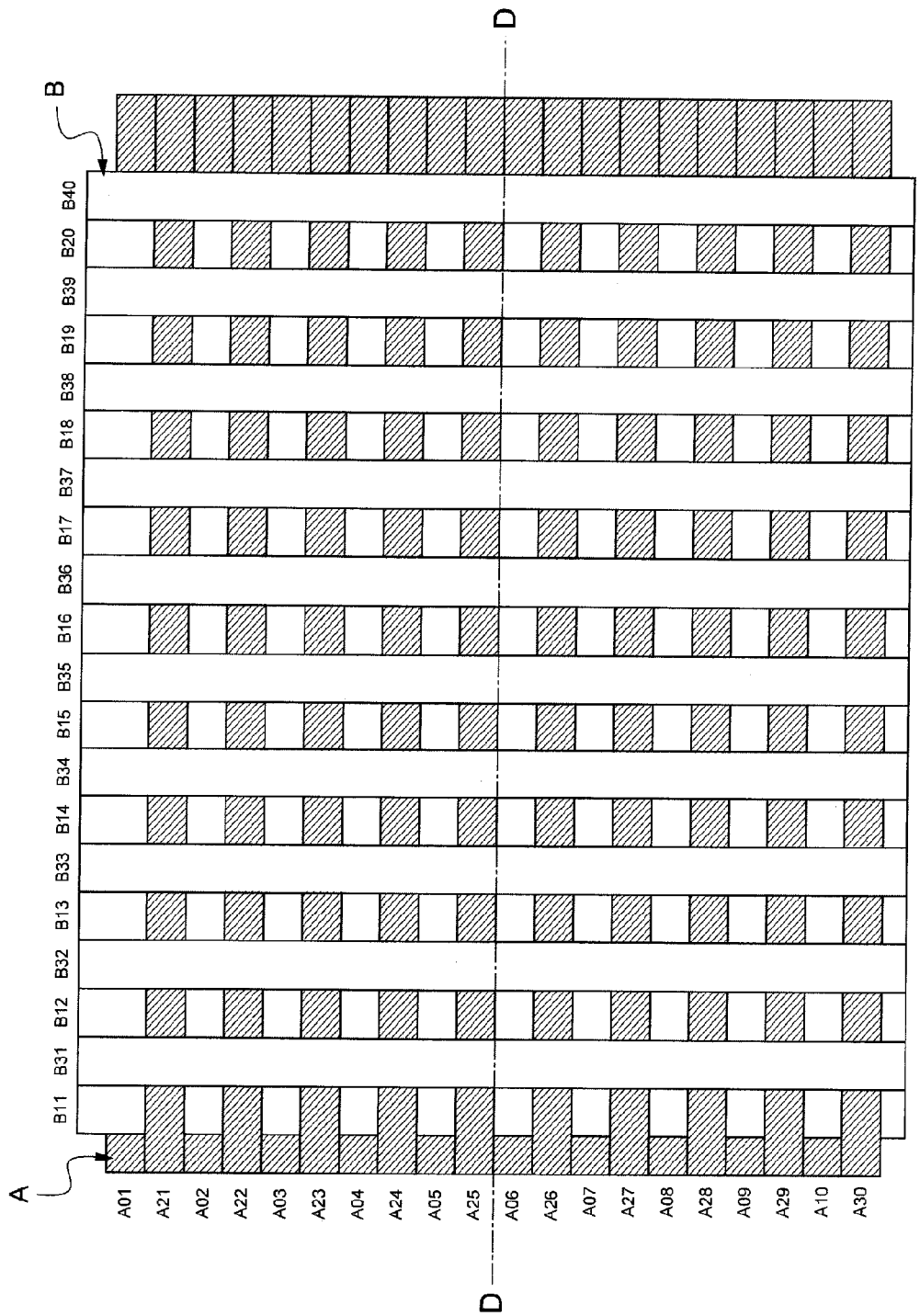
FIG. 2 shows another element of a reinforcing coating obtained by the method in accordance with the invention and comprising two superposed layers.

FIG. 2 shows another example of reinforcing coating obtained by the method in accordance with the invention and comprising two superposed slivers A and B with a pitch of 2. Each layer A, B comprises respective slivers Ai and Bj, i and j being integers. The slivers Ai and Bj present a pitch of 2 and are oriented respectively at 0° and at 90° relative to a direction D. The slivers A01 to A10, which are disjoint by a pitch equal to 2, are thus parallel to the direction D and they are put into place during a first laying operation on a part (not shown). The slivers B11 to B20, which are disjoint by a pitch equal to 2, are subsequently put into place during a second laying operation at 90° relative to the slivers A01 to A10, overlying them. The slivers A21 to A30 are disjoint by the pitch equal to 2, they are parallel to the direction D, and they are put into place during a third laying operation on the part (not shown) above the slivers that have already put been into place. The slivers B31 to B40 are disjoint by the pitch equal to 2, and they are subsequently put into place during a fourth laying operation at 90° over the previously-placed slivers. This produces the pre-impregnated coating in full.

Figure 3:
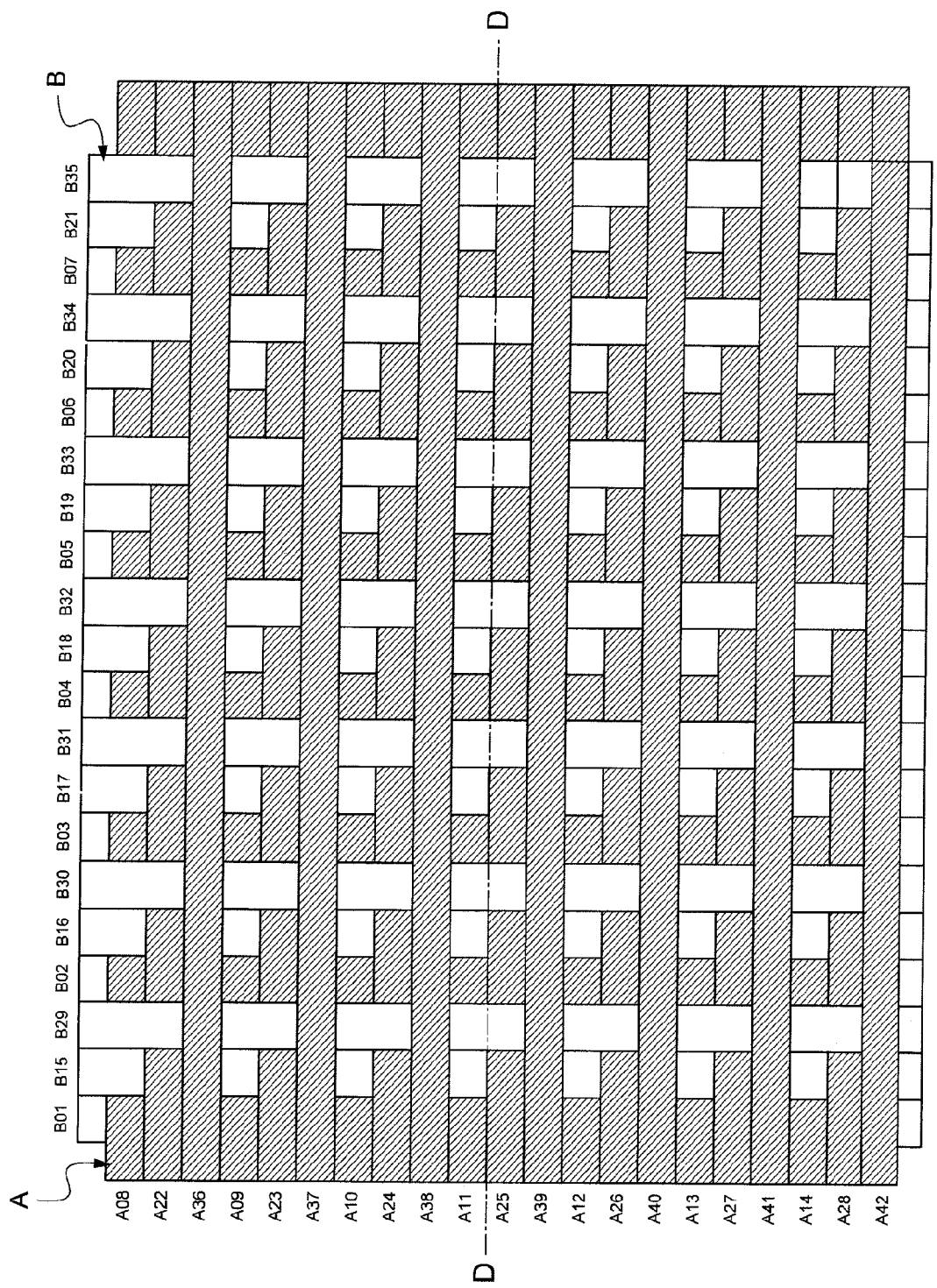
FIG. 3 shows another element of a reinforcing coating obtained by the method in accordance with the invention and comprising two superposed layers.

FIG. 3 shows another example of a reinforcing coating obtained by the method in accordance with the invention and comprising two superposed layers A and B with a pitch equal to 3. Thus, during successive laying operations the following slivers are put into place:

slivers B01 to B07;
slivers A08 to A14;
slivers B15 to B21;
slivers A22 to A28;
slivers B29 to B35; and
slivers A36 to A42.

Figure 4:
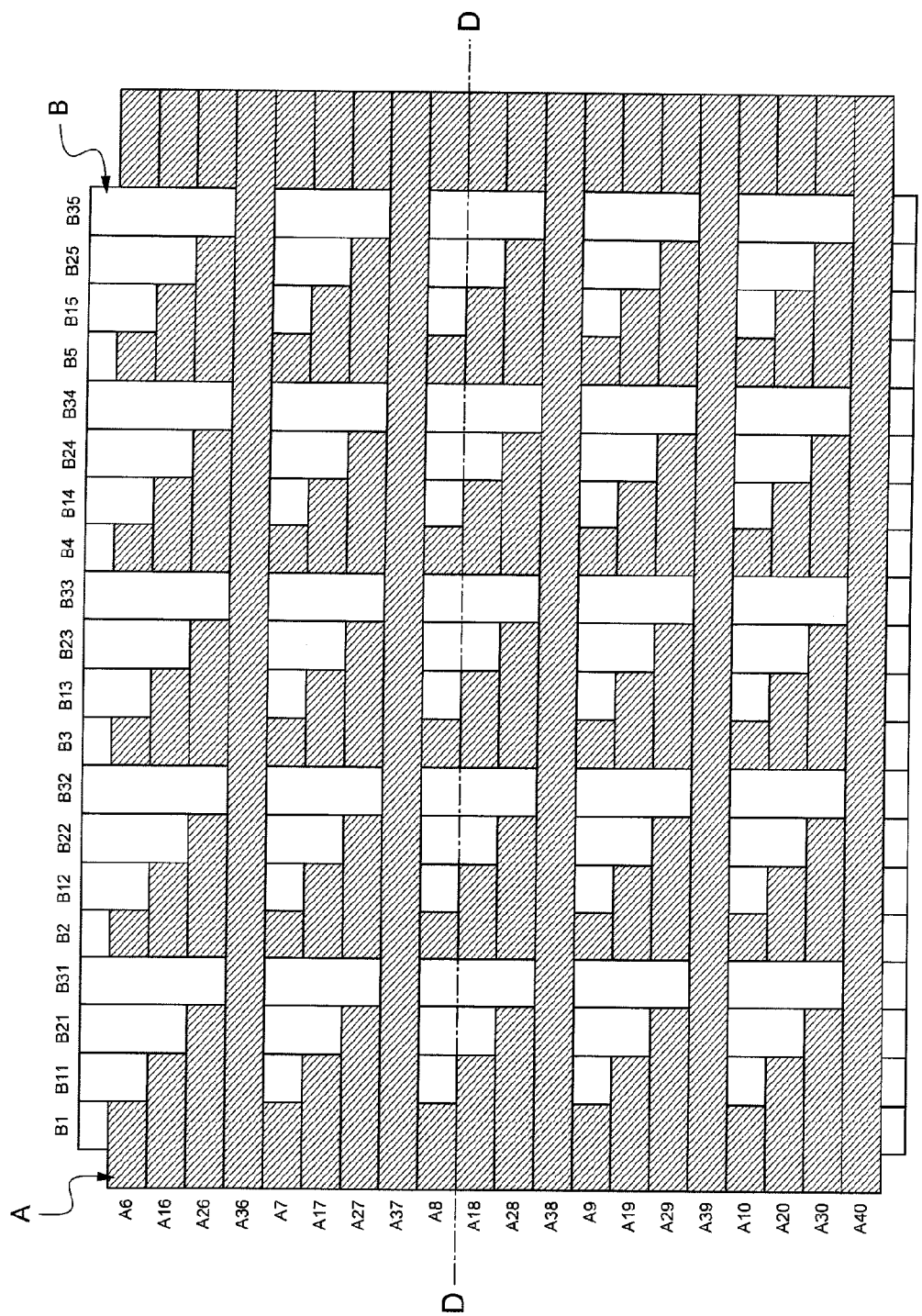
FIG. 4 shows another element of a reinforcing coating obtained by the method in accordance with the invention and comprising two superposed layers.

FIG. 4 shows another example of reinforcing coating obtained by the method in accordance with the invention and comprising two superposed layers A and B with a pitch equal to 4. Thus, during successive laying operations, the following slivers are put into place:

slivers B1 to B5;
slivers A6 to A10;
slivers B11 to B15;
slivers A16 to A20;
slivers B21 to B25;
slivers A26 to A30;
slivers B31 to B35; and
slivers A36 to A40.

Figure 5:
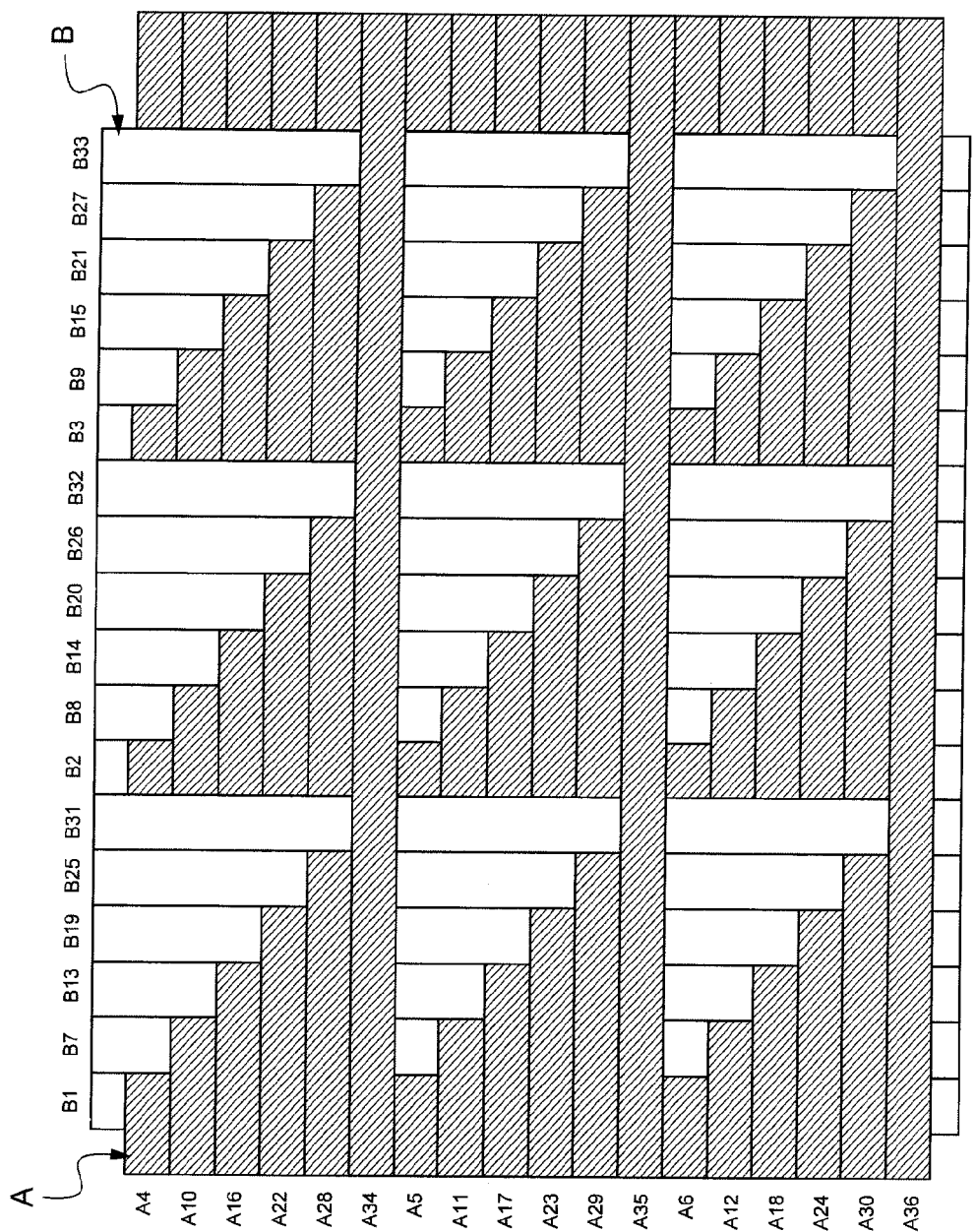
FIG. 5 shows another element of a reinforcing coating obtained by the method in accordance with the invention and comprising two superposed layers.

FIG. 5 shows another example of reinforcing coating obtained by the method in accordance with the invention and comprising two superposed layers A and B with a pitch equal to 6. Thus, during successive laying operations, the following slivers are put into place:
- slivers B1 to B3;
- slivers A4 to A6;
- slivers B7 to B9;
- slivers A10 to A12;
- slivers B13 to B15;
- slivers A16 to A18;
- slivers B19 to B21;
- slivers A22 to A24;
- slivers B25 to B27;
- slivers A28 to A30;
- slivers B31 to B33; and
- slivers A34 to A36.

Figure 6:
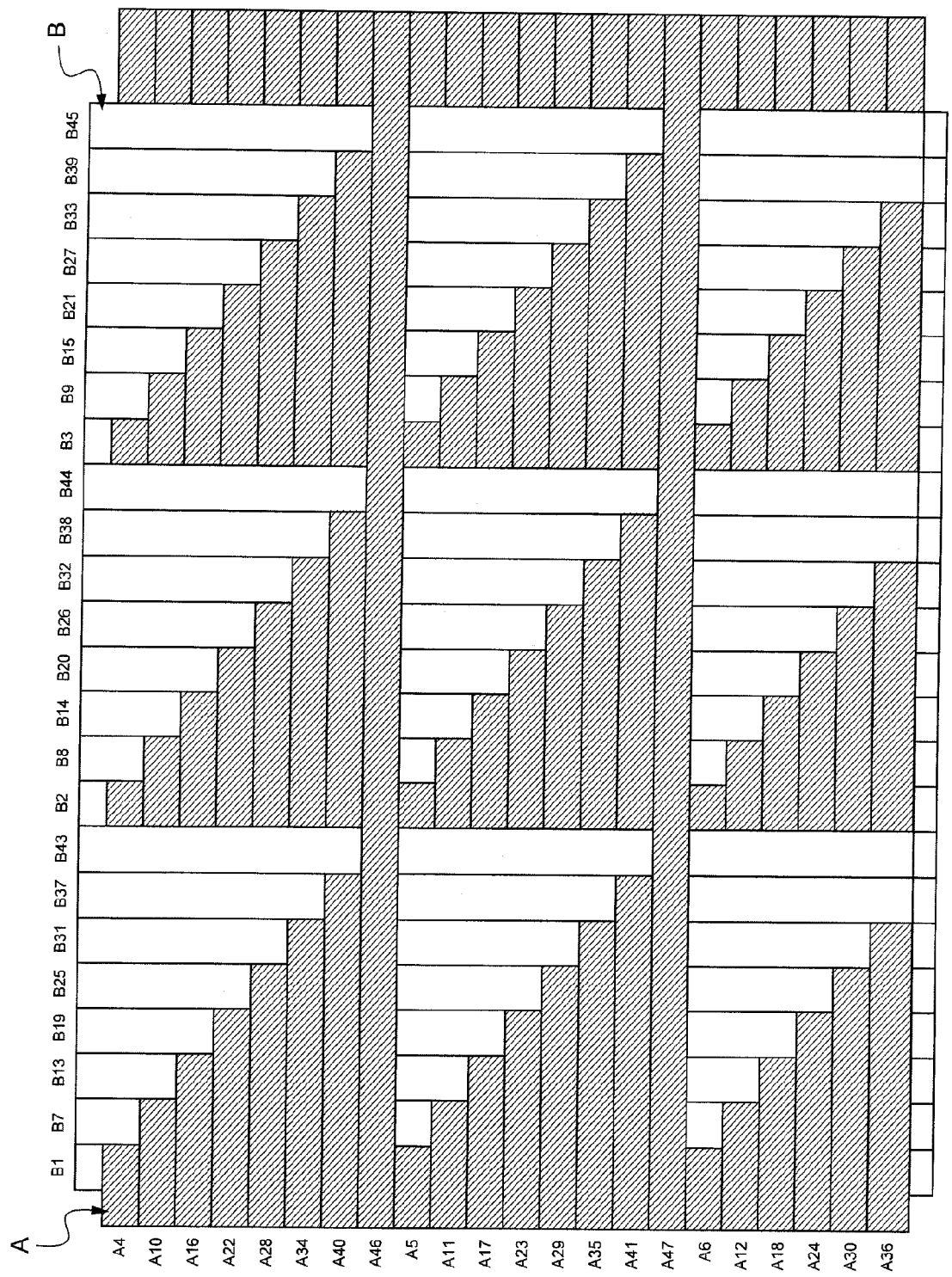
FIG. 6 shows another element of a reinforcing coating obtained by the method in accordance with the invention and comprising two superposed layers.

FIG. 6 shows another example of reinforcing coating obtained by the method in accordance with the invention and comprising two superposed layers A and B with a pitch equal to 8. Thus, during successive laying operations, the following slivers are put into place:
- slivers B1 to B3;
- slivers A4 to A6;
- slivers B7 to B9;
- slivers A10 to A12;
- slivers B13 to B15;
- slivers A16 to A18;
- slivers B19 to B21;
- slivers A22 to A24;
- slivers B25 to B27;
- slivers A28 to A30;
- slivers B31 to B33;
- slivers A34 to A36;
- slivers B37 to B39;
- slivers A40 to A42;
- slivers B43 to B45; and
- slivers A46 to A48.

All of the embodiments of superposed layers may be made by winding.

Figure 7:
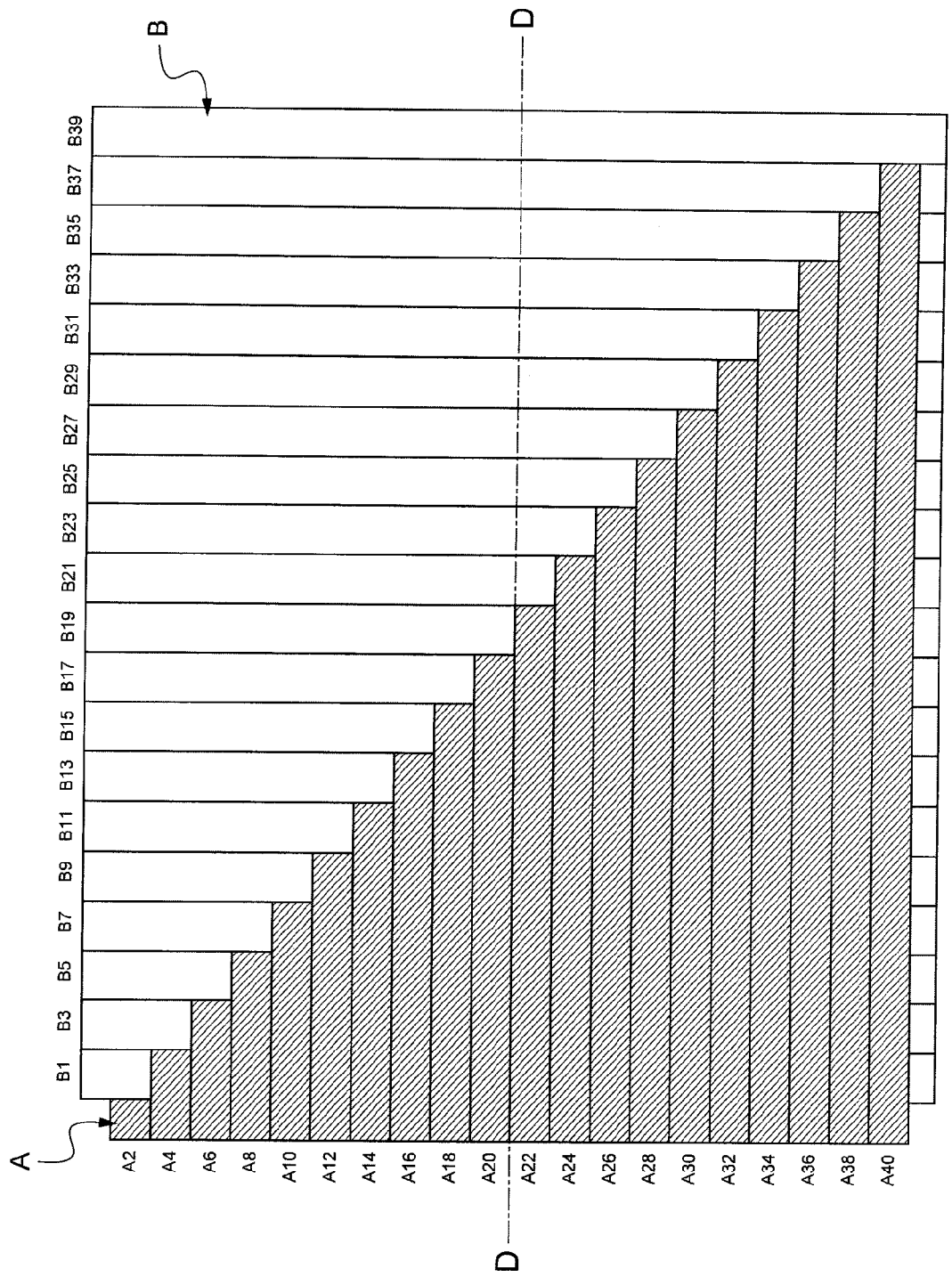
FIG. 7 shows another element of a reinforcing coating obtained by the method in accordance with the invention and comprising two interlaced layers.

FIG. 7 shows another example of reinforcing coating obtained by the method in accordance with the invention and comprising two interlaced layers A and B with a pitch equal to 1. During successive laying operations, the sliver $A(2i)$ is put into place and then over it and in alternation, the sliver $B(2i-1)$, where i is an integer lying in the range 1 to 20.

Figure 8:
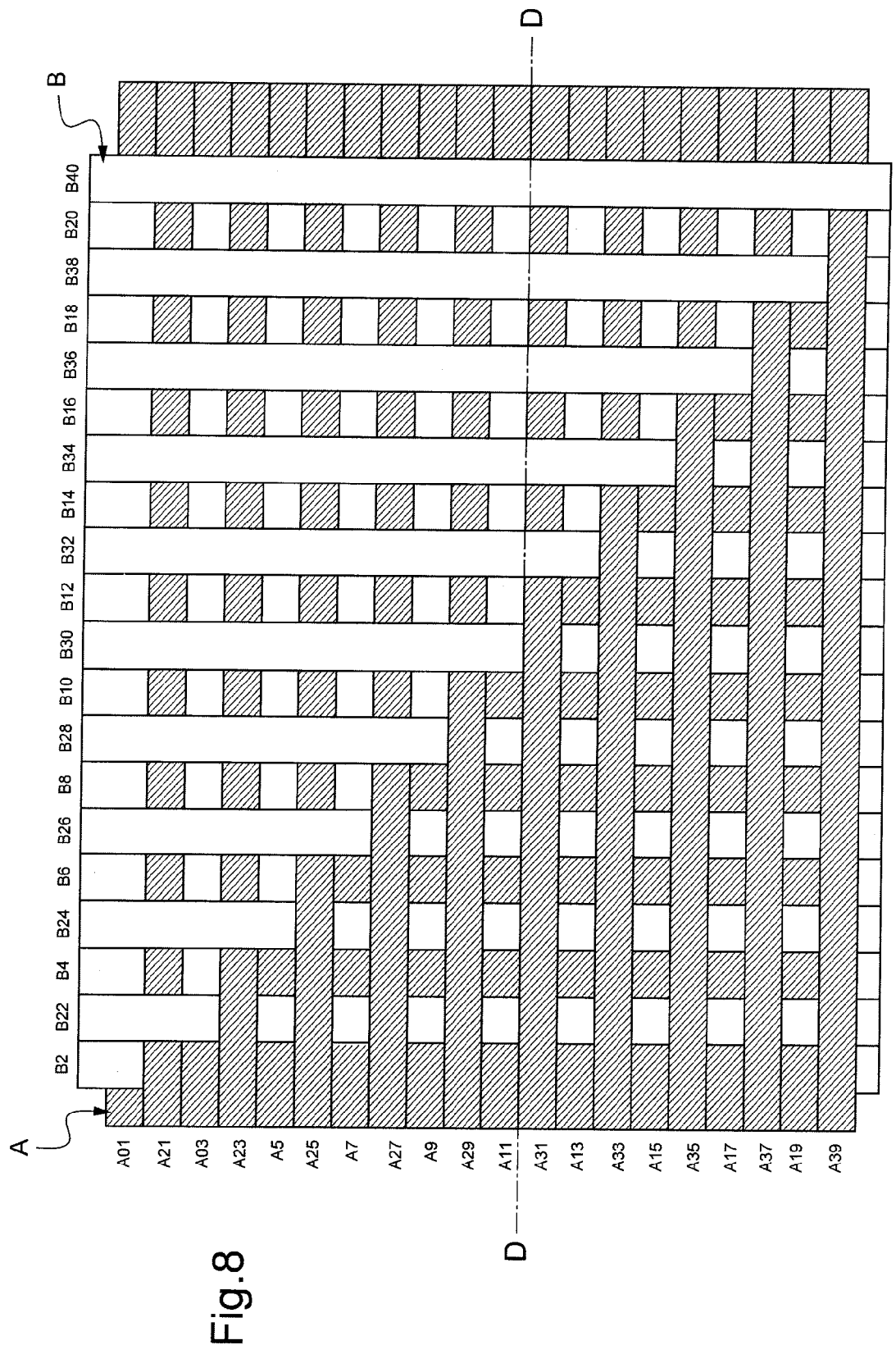
FIG. 8 shows another element of a reinforcing coating obtained by the method in accordance with the invention and comprising two interlaced layers.

FIG. 8 shows another example of reinforcing coating obtained by the method in accordance with the invention and comprising two interlaced layers A and B with a pitch equal to 2. During successive laying operations, the sliver $A(2i-1)$ is put into place, then over it and in alternation, the sliver $B(2i)$, where i is an integer in the range 1 to 20, and incremented by unity on each laying operation. With each incrementation, the following sliver is put into place separated from the preceding sliver by the pitch of 2, and this applies to each of the layers A and B.

Figure 9:
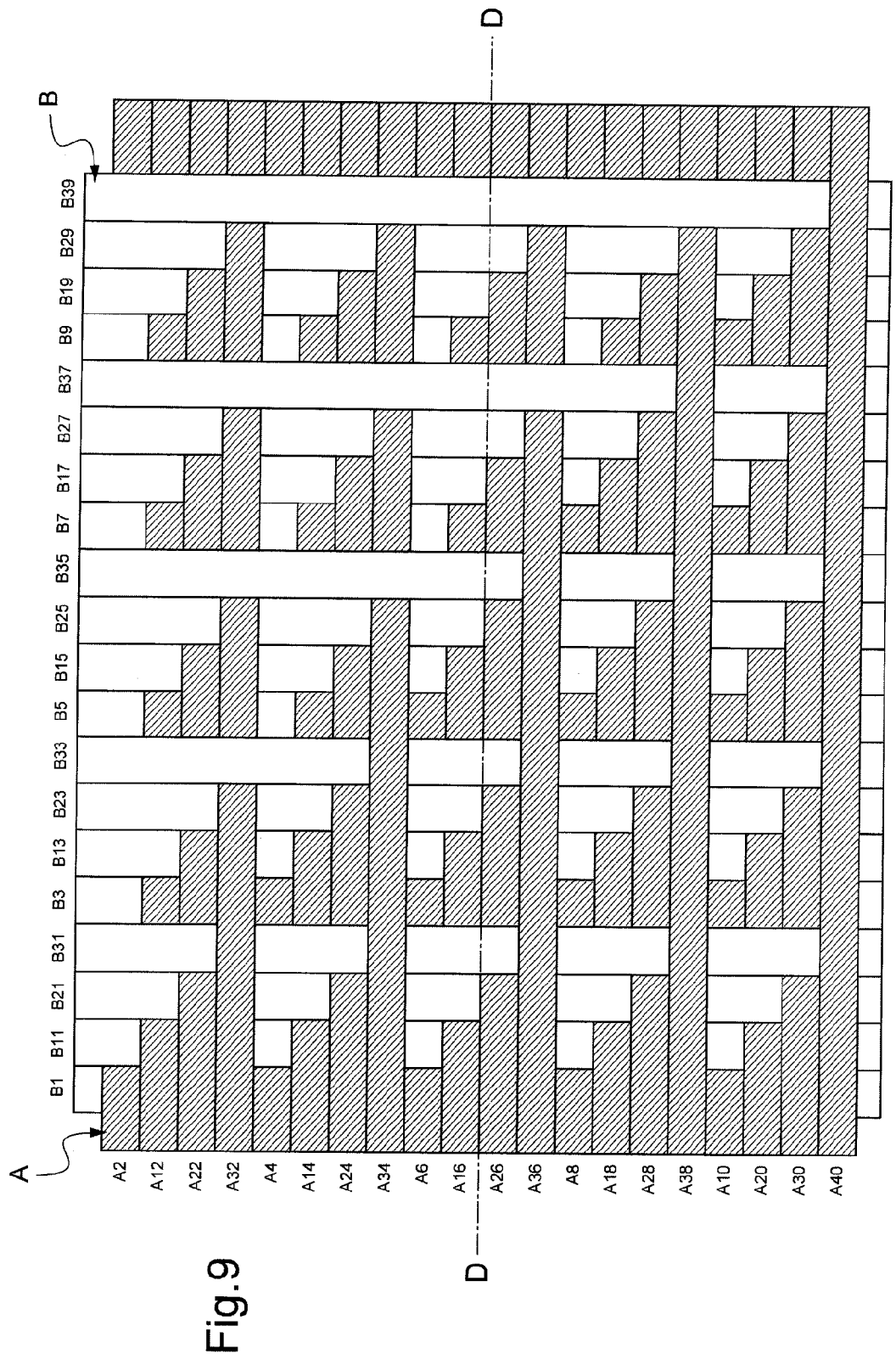
FIG. 9 shows another element of a reinforcing coating obtained by the method in accordance with the invention and comprising two interlaced layers.

FIG. 9 shows another example of reinforcing coating obtained by the method in accordance with the invention and comprising two interlaced layers A and B with a pitch equal to 4. During successive laying operations, the sliver $B(2i-1)$ is put into place, then over it and in alternation, the sliver $A(2i)$, with i being an integer lying in the range 1 to 20, being incremented by unity on each laying operation. With each incrementation, the following sliver is put into place separated from the preceding sliver by the pitch of 4, with this applying to each of the layers A and B.

Figure 10:
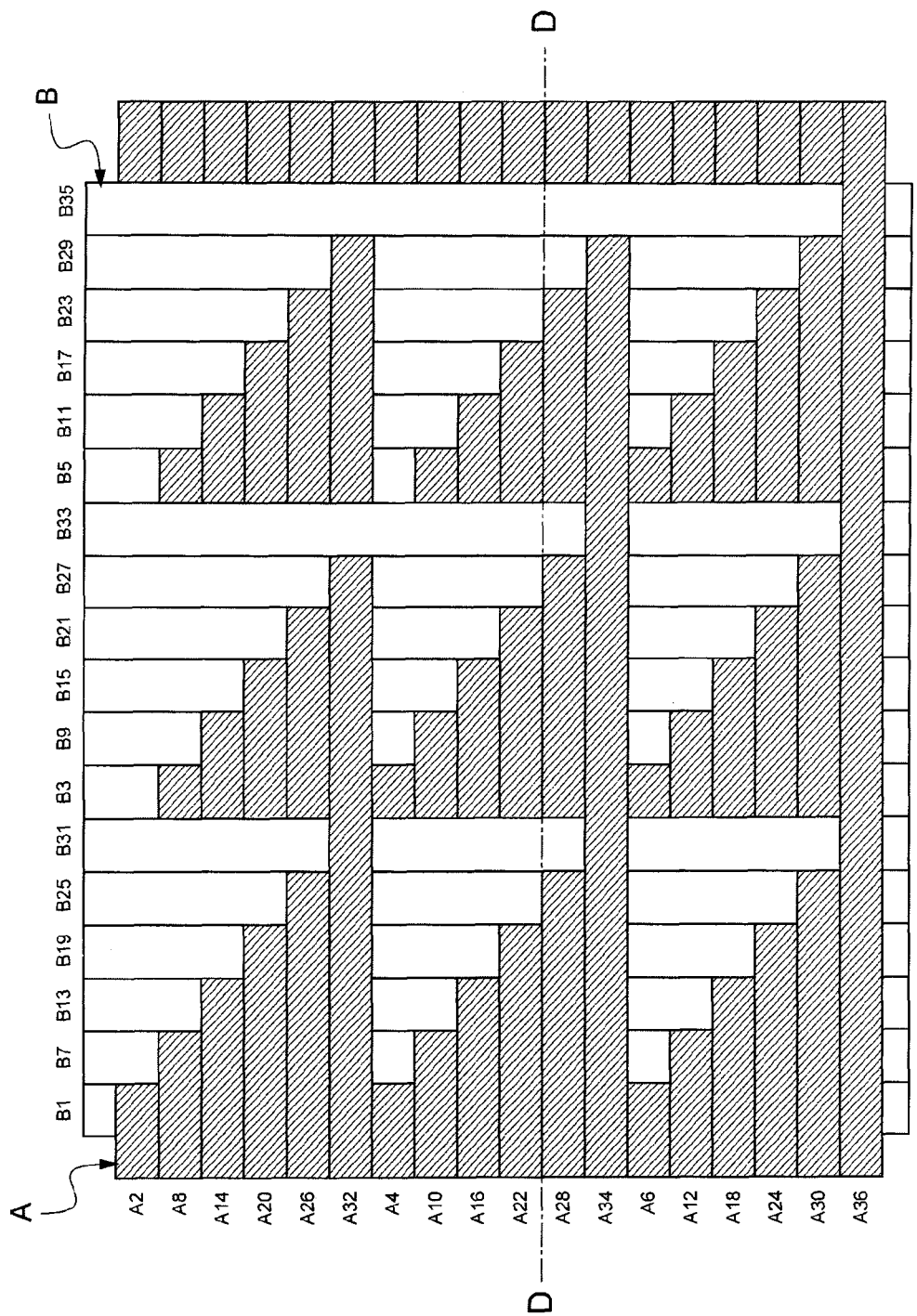
FIG. 10 shows another element of a reinforcing coating obtained by the method in accordance with the invention and comprising two interlaced layers.

FIG. 10 shows another example of reinforcing coating obtained by the method in accordance with the invention and comprising two interlaced layers A and B with a pitch equal to 6. During successive laying operations, the sliver $B(2i-1)$ is put into place and then over it and in alternation, the sliver $A(2i)$, where i is an integer in the range 1 to 20, being incremented by unity for each laying operation. With each incrementation, the following sliver is put into place, separated from the preceding sliver by the pitch of 6, with this applying to each of the layers A and B.

Figure 11:
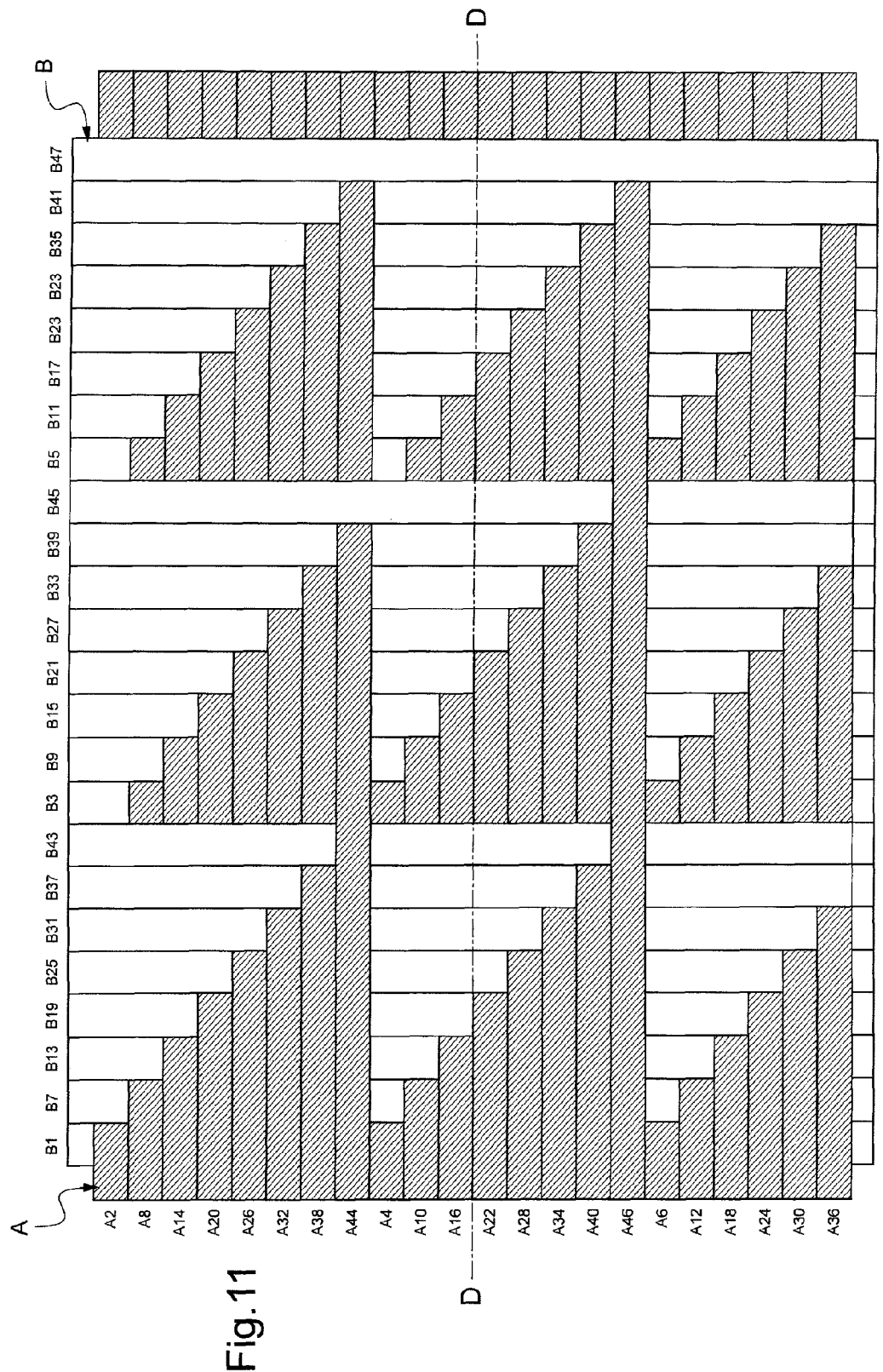
FIG. 11 shows another element of a reinforcing coating obtained by the method in accordance with the invention and comprising two interlaced layers.

FIG. 11 shows another example of reinforcing coating obtained by the method in accordance with the invention and comprising two interlaced layers A and B with a pitch equal to 8. During successive laying operations, the sliver $B(2i-1)$ is put into place, and then over it and in alternation, the sliver $A(2i)$, with i being an integer in the range 1 to 20, being incremented by unity for each laying operation. With each incrementation, the following sliver is put into place, separated from the preceding sliver by the pitch of 8, with this applying for each of the layers A and B.

Figure 12:
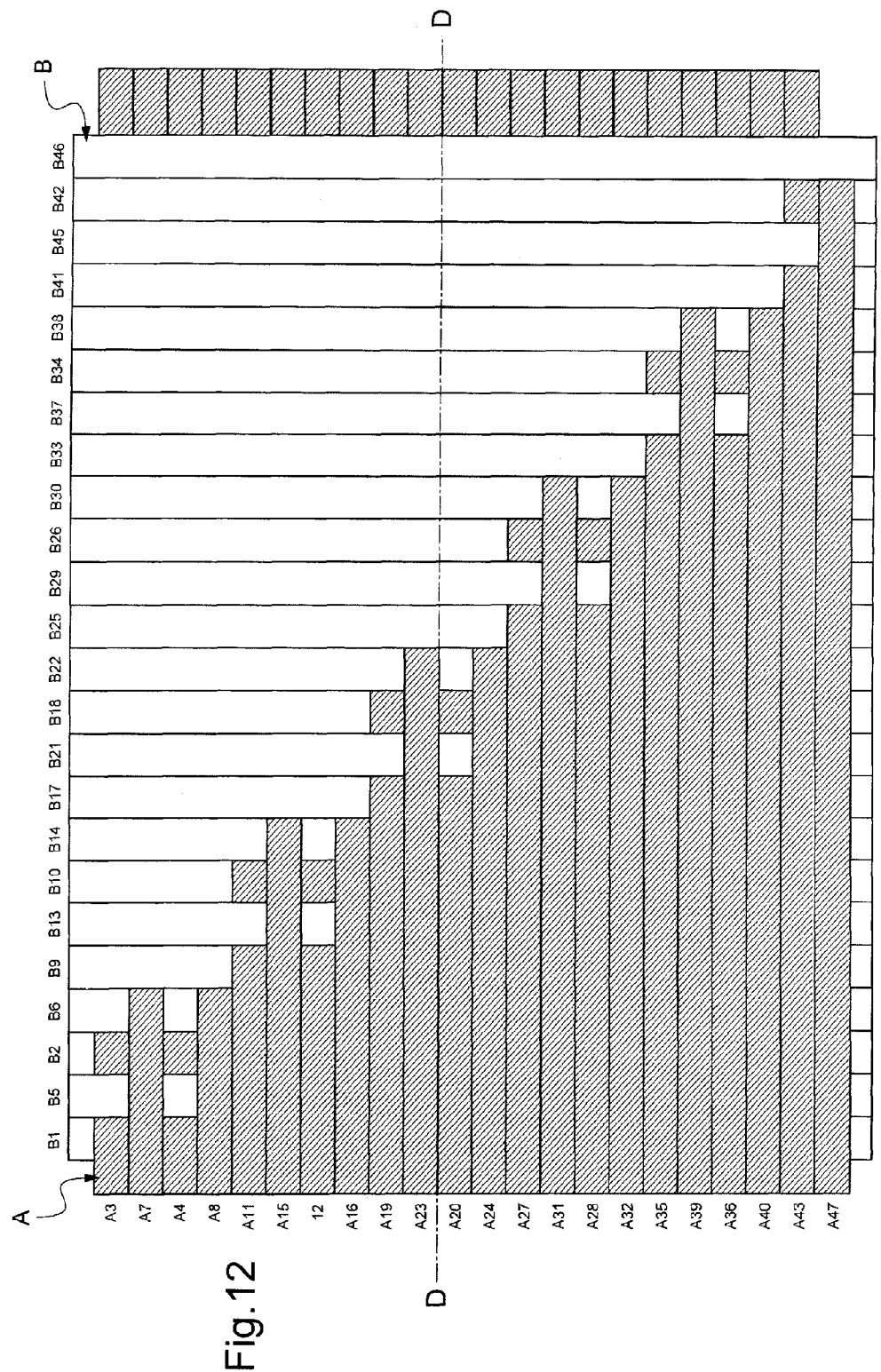
FIG. 12 shows another element of a reinforcing coating obtained by the method in accordance with the invention and comprising two interlaced layers of two slivers at a pitch of 2.

FIG. 12 shows another example of reinforcing coating obtained by the method in accordance with the invention and comprising two interlaced layers A and B of two slivers laid simultaneously with a pitch of 2. During successive laying operations, the slivers $B(2i-1)$ and $B(2i)$ are put into place simultaneously, where i is an odd integer lying in the range 1 to 23 and is incremented by two for each laying operation, with the slivers $A(2i-1)$ and $A(2i)$ being put into place simultaneously over and in alternation with the previous slivers, i being an even integer in the range 2 to 20 and being incremented by two on each laying operation. With each incrementation, the following sliver is put into place separated from the preceding sliver by the pitch of 2, with this applying to each of the layers A and B.

Such a coating is suitable for being made rather by placing fibers or by braiding in a manner that is common-place in the state of the art.

Figure 13:
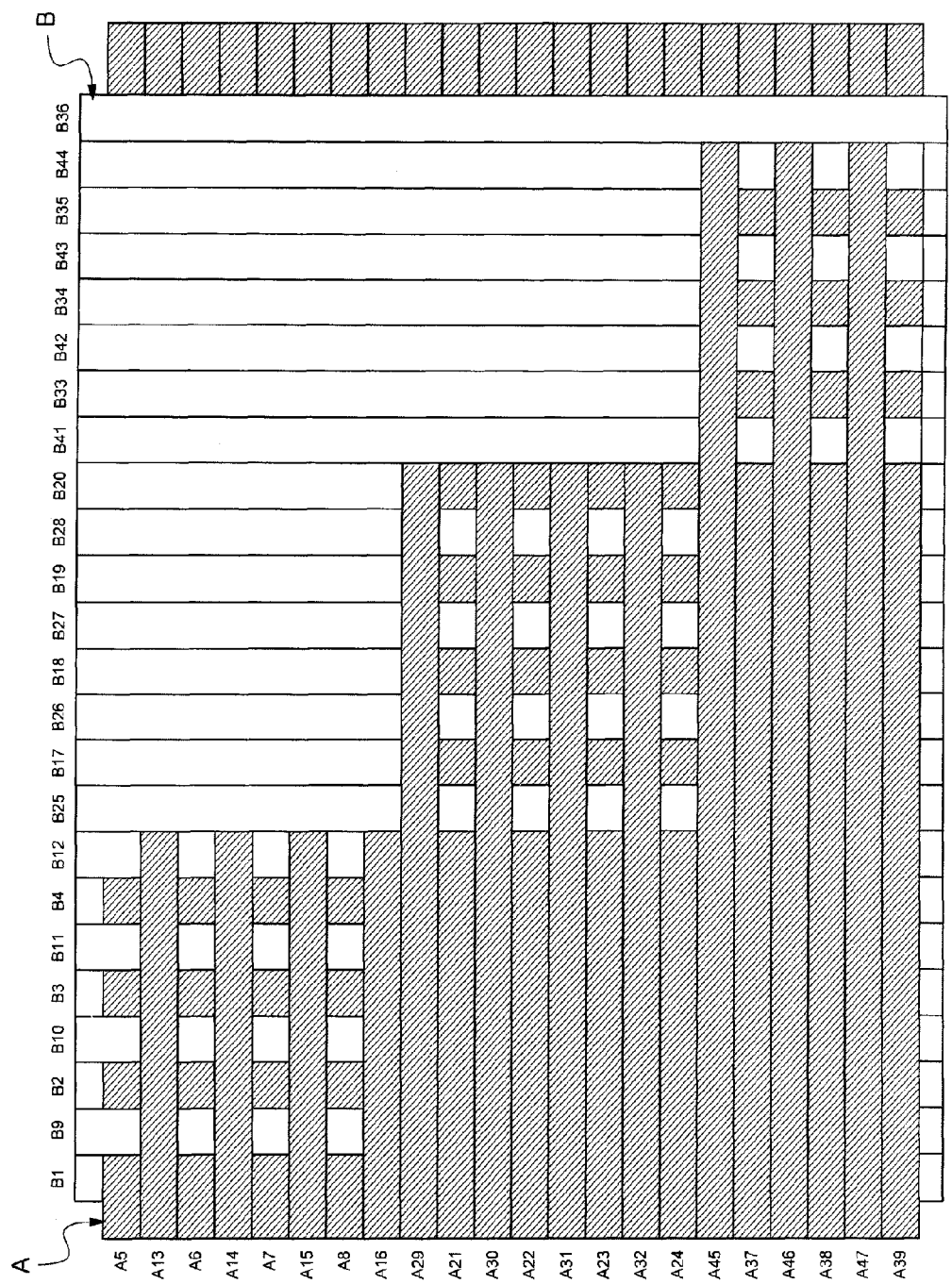
FIG. 13 shows another element of a reinforcing coating obtained by the method in accordance with the invention and comprising two interlaced layers of four slivers at a pitch of 2.

FIG. 13 shows another example of reinforcing coating obtained by the method in accordance with the invention and comprising two interlaced layers A and B of four slivers laid simultaneously, with a pitch of 2. During successive laying operations, the slivers B1 to B4 are put into place simultaneously, separated by a pitch of 2, and over and in alternation, the slivers A5 to A8 are put into place simultaneously while being separated by a pitch of 2. On each successive laying operation, the slivers in the same previously-placed layer are incremented by eight. Thus, during the third laying operation, the slivers B9 to B12 are put into place simultaneously and during the fourth laying operation, the slivers A13 to A16 are put into place simultaneously.

Such a coating is suitable for being made rather by placing fibers or by braiding in a manner that is common-place in the state of the art.

Figure 14:
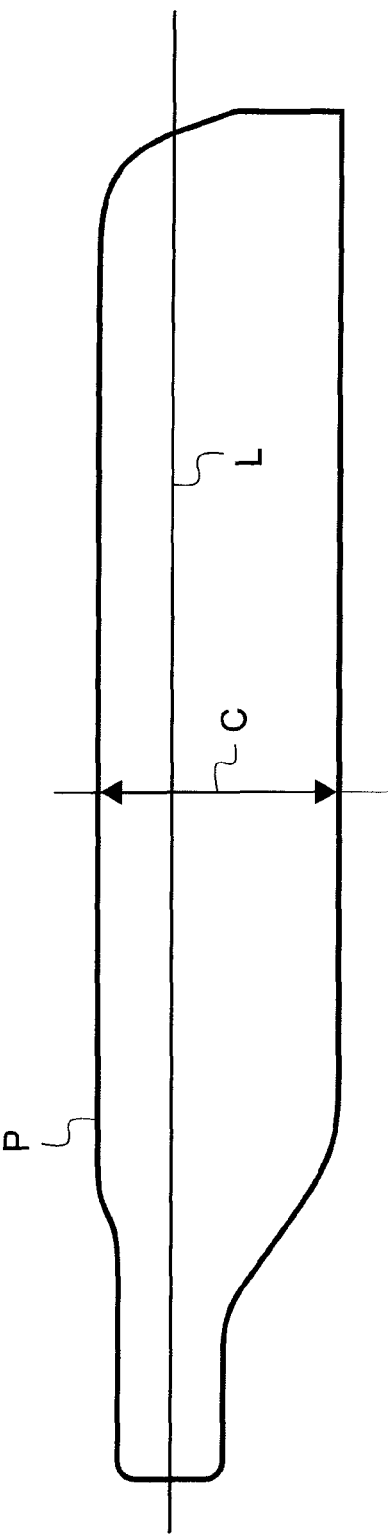
FIG. 14 shows an embodiment of a blade on which the reinforcing coating obtained by the method in accordance with the invention is to be applied.

FIG. 14 shows an embodiment of a blade P presenting a longitudinal direction L and a chord C. The method in accordance with the invention serves to apply a reinforcing coating on such a blade P.

Figure 15:
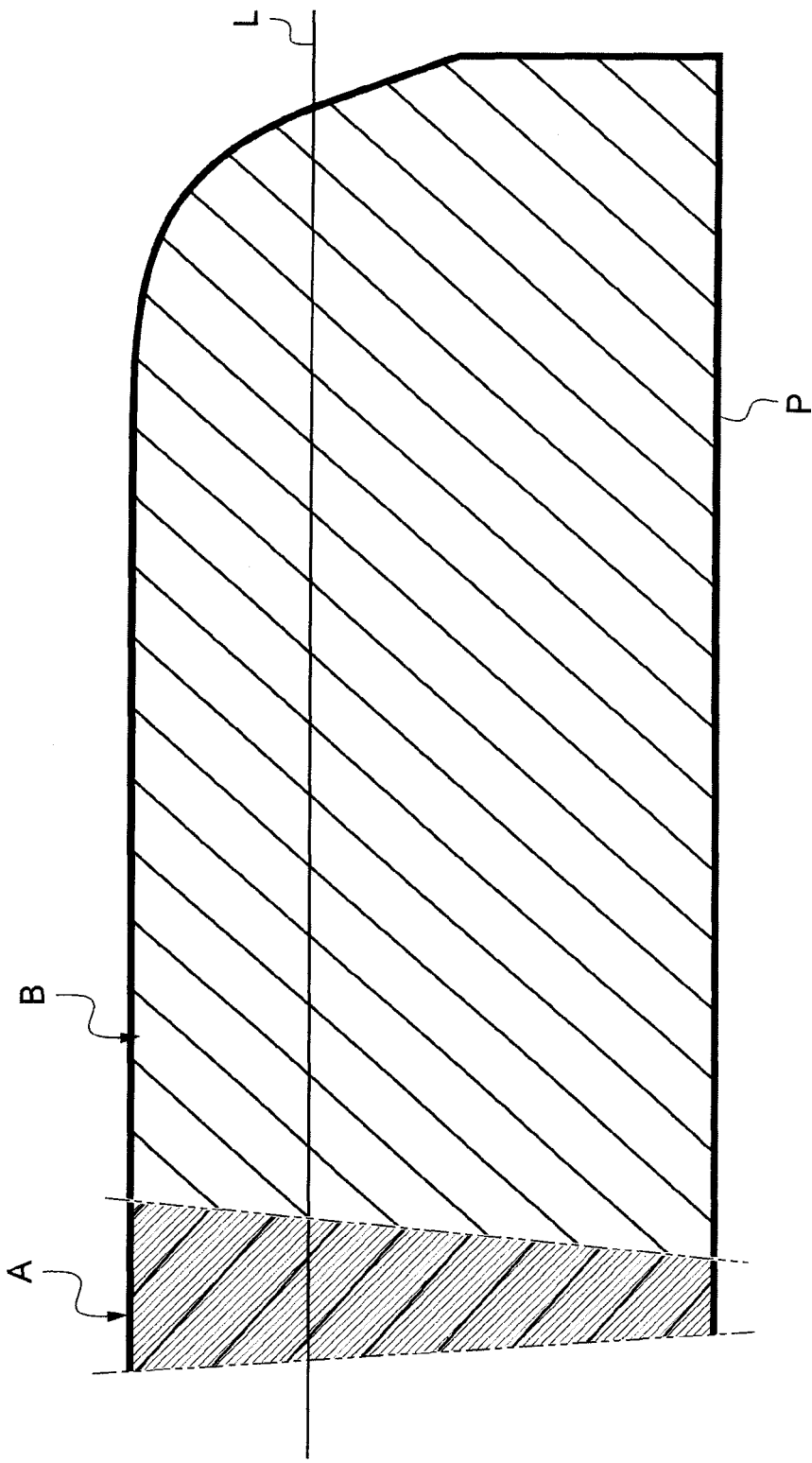
FIG. 15 shows a blade on which the FIG. 1 embodiment of the reinforcing coating is applied.

FIG. 15 is a diagram of the blade P having applied thereon the FIG. 1 embodiment of the reinforcing coating. The slivers of the layers A and B are inclined at 45° relative to the longitudinal direction L of the blade P. Such a coating can be made by placing fibers and by winding. Under such circumstances, as for all layer crossings of the superposed type, fiber placing produces a result that is comparable to that which is obtained by winding.

Figure 16:
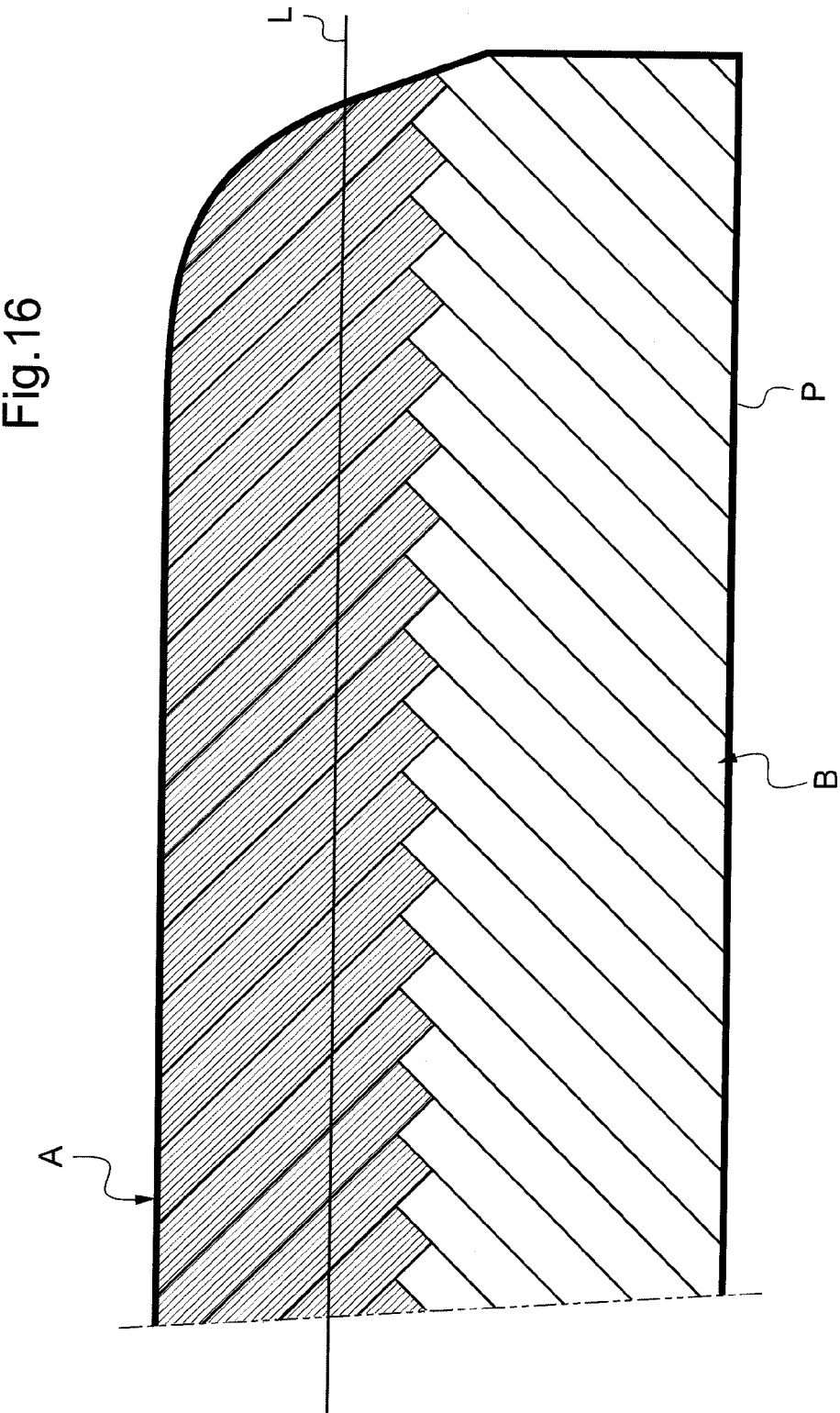
FIG. 16 shows a blade on which the FIG. 7 embodiment of the reinforcing coating is applied.

FIG. 16 shows the blade P having the FIG. 7 embodiment of the reinforcing coating applied thereto. The slivers of the layers A and B are inclined at ±45° relative to the longitudinal direction L. In addition, the stiffness in the leading edge box of the blade P is not degraded by the layer changes, providing the layer crossing line does not overlie it. The fibers are not disturbed by the layer crossings and they retain their mechanical characteristics in full.

Such a coating is suitable for being made rather by placing fibers or by braiding in a manner that is common-place in the state of the art.

Figure 17:
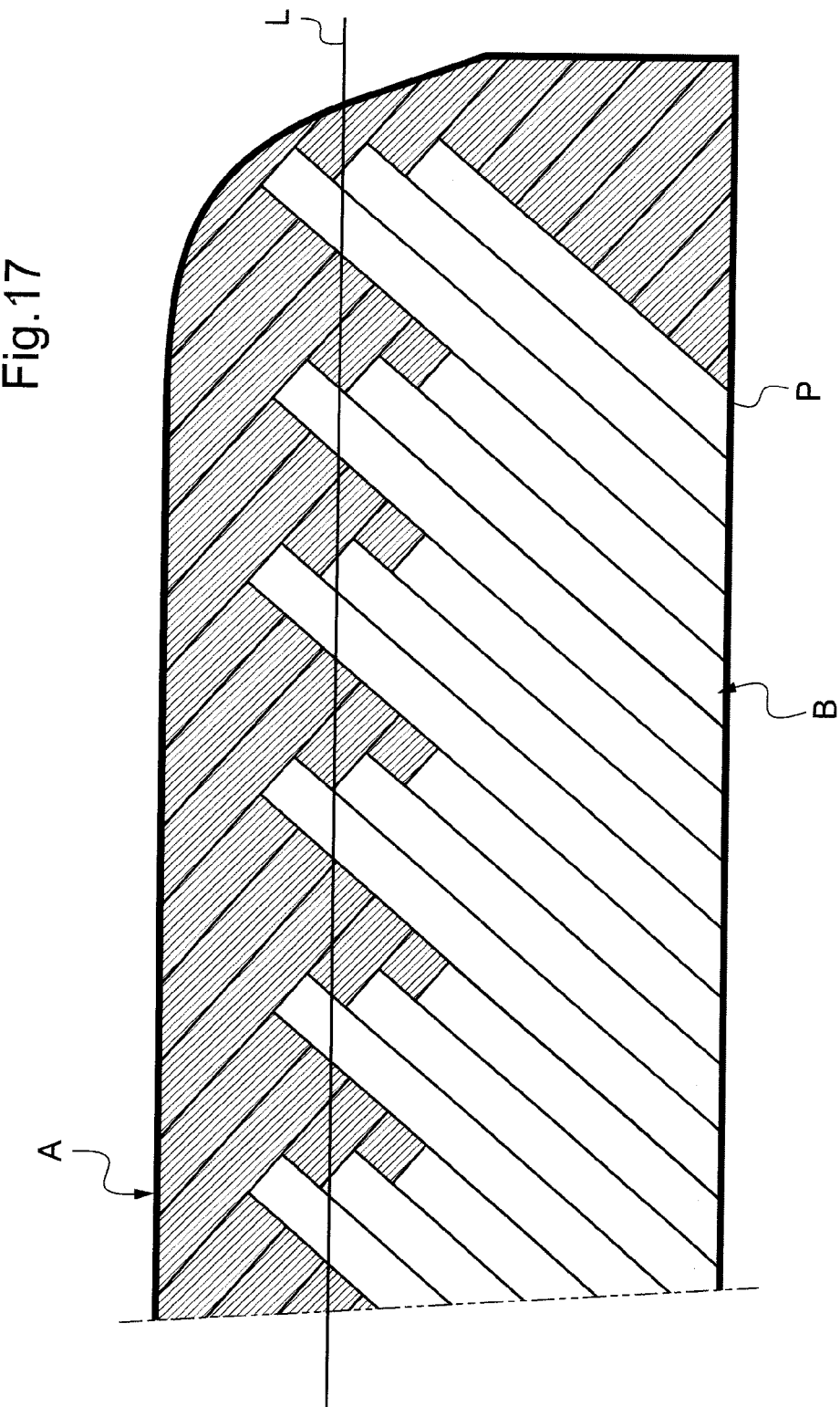
FIG. 17 shows a blade on which the FIG. 20 embodiment of the reinforcing coating is applied.
Figure 20:
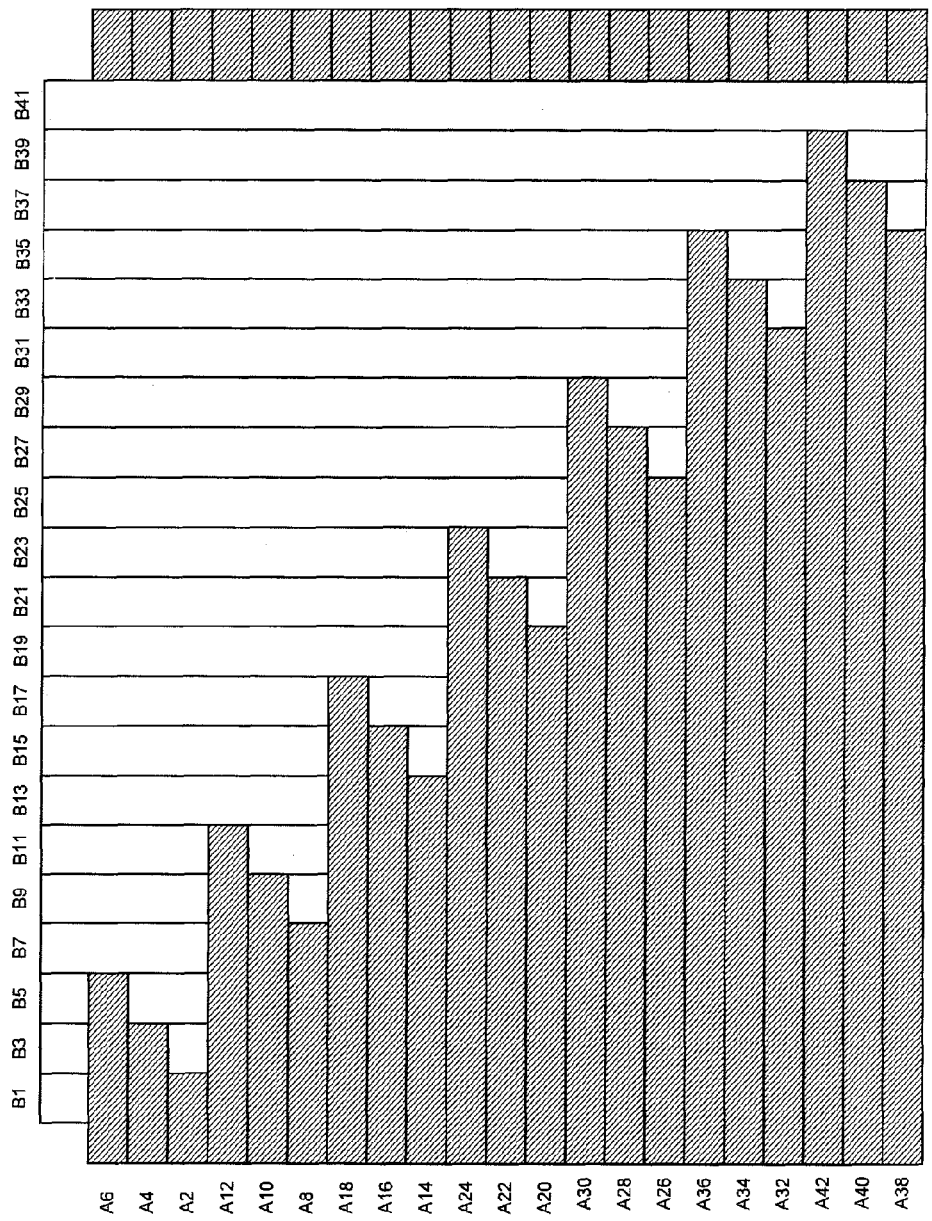
FIG. 20 shows another element of a reinforcing coating obtained by the method in accordance with the invention and comprising two interlaced layers.

FIG. 17 shows the blade P having applied thereon the embodiment of the reinforcing coating that comprises two interlaced layers with a pitch of 3, as shown in FIG. 20. The slivers of the layers A and B are inclined at ±45° relative to the longitudinal direction L.

Such a coating is suitable for being made rather by placing fibers or by braiding in a manner that is common-place in the state of the art.

Figure 18:
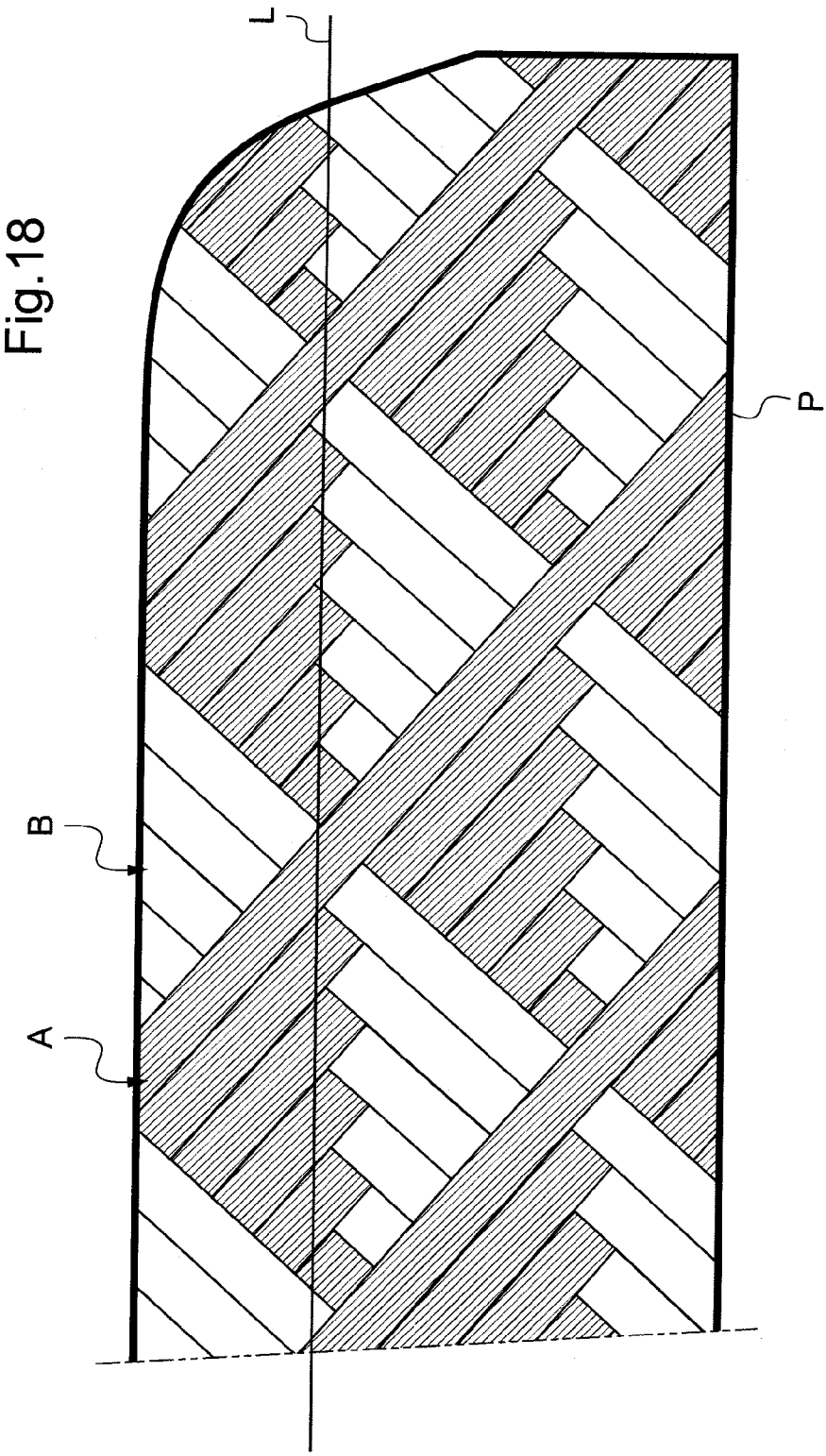
FIG. 18 shows a blade on which the FIG. 5 embodiment of the reinforcing coating is applied.

FIG. 18 shows a blade P having applied thereto the FIG. 5 embodiment of the reinforcing coating. The slivers of the layers A and B are inclined at ±45° relative to the longitudinal direction L. Such a coating may be made by placing fibers or by winding.

By way of example, when a winding mandrel is used, it is also possible to speak of placing fibers if the fibers are pressed against the mandrel by the effect of a laying head.

Figure 19:
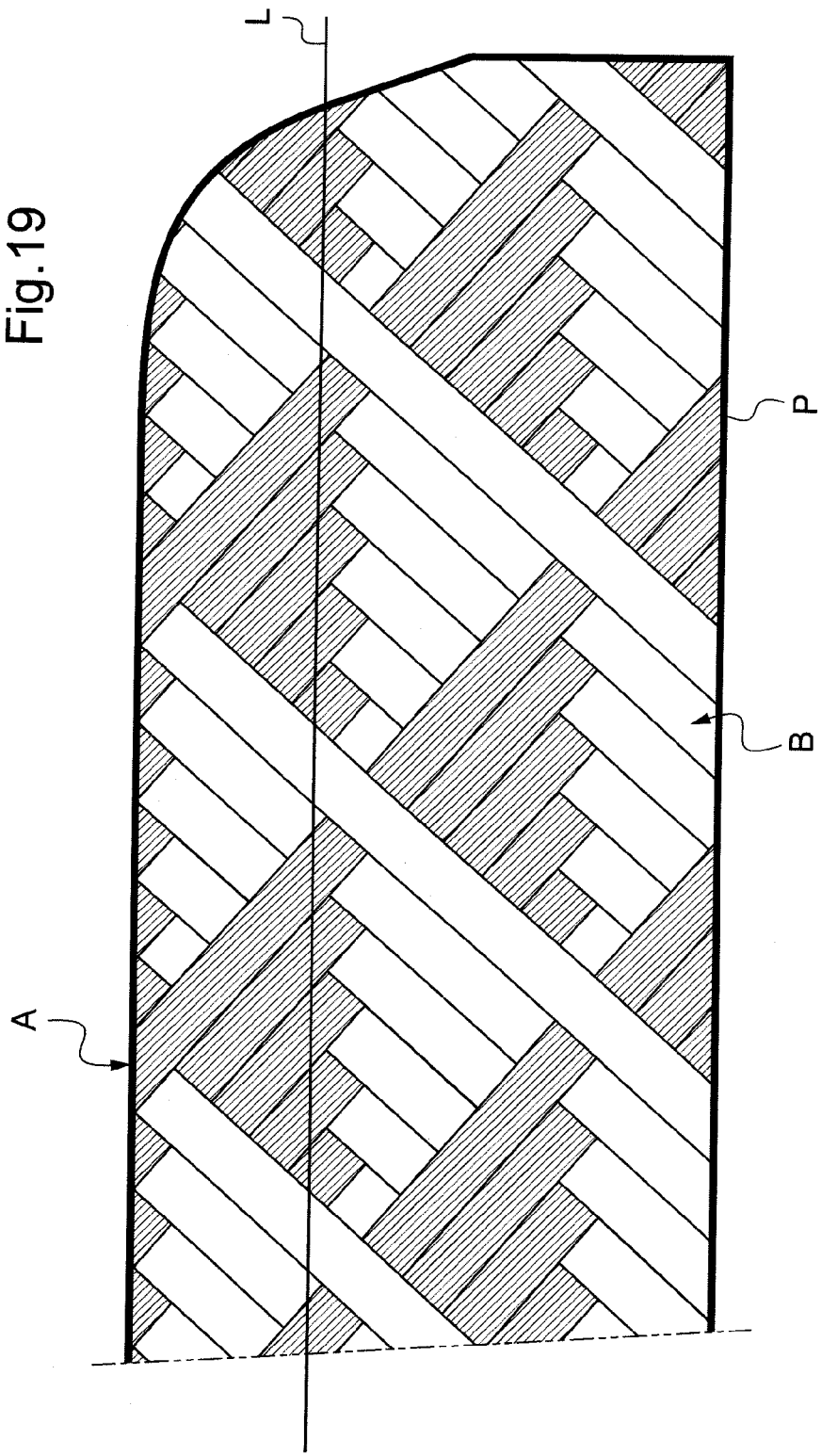
FIG. 19 shows a blade on which the FIG. 10 embodiment of the reinforcing coating is applied.

FIG. 19 shows the blade P having applied thereto the FIG. 10 embodiment of the interlaced reinforcing coating. The slivers of the layers A and B are inclined at ±45° relative to the longitudinal direction L.

Such a coating is suitable for being made rather by placing fibers or by braiding in a manner that is common-place in the state of the art.

FIG. 20 shows another example of a reinforcing coating obtained by the method in accordance with the invention and comprising two interlaced layers.

Figure 21:
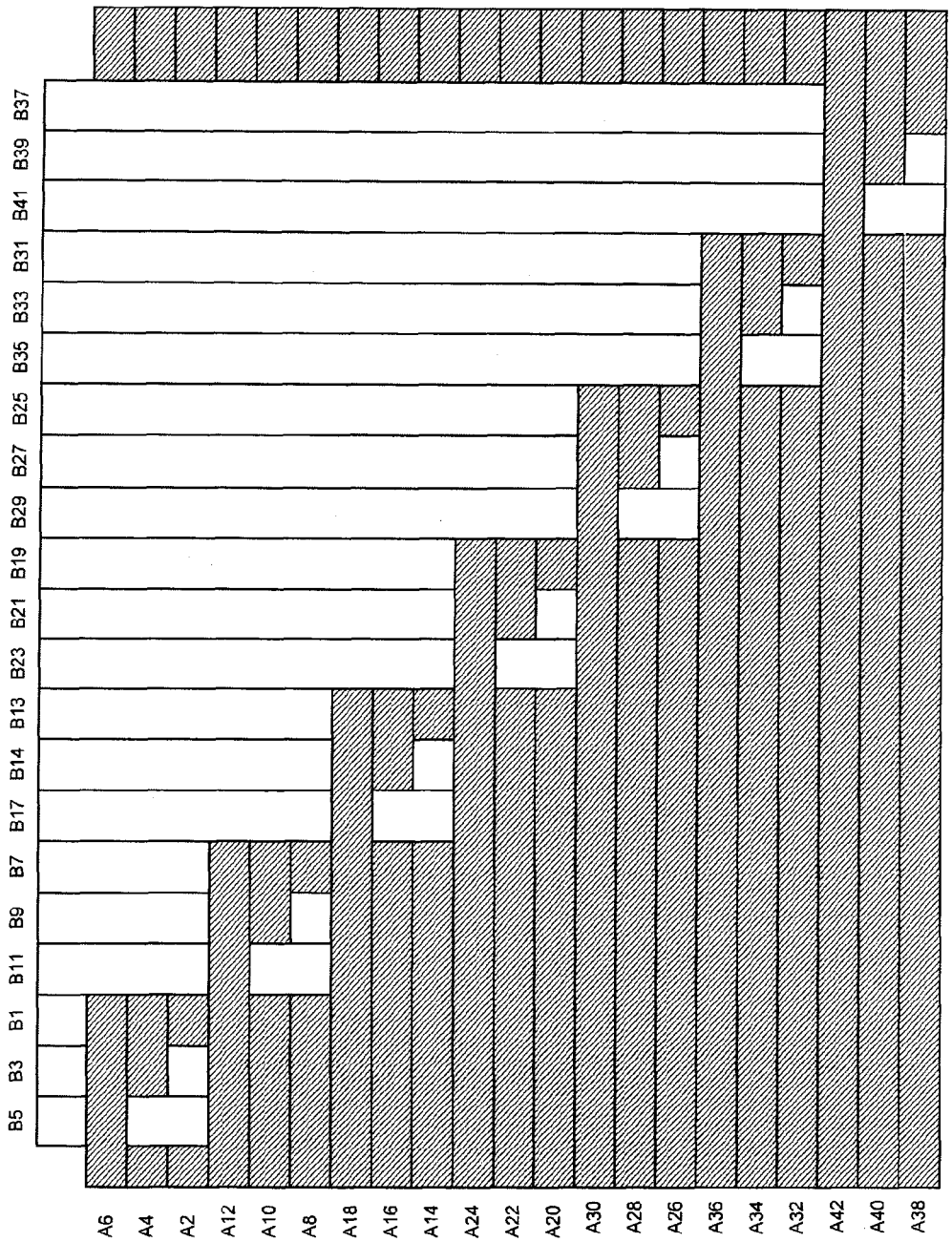
FIG. 21 shows another element of a reinforcing coating obtained by the method in accordance with the invention and comprising two interlaced layers.

FIG. 21 shows another example of reinforcing coating obtained by the method in accordance with the invention and comprising two interlaced layers.

Figure 22:
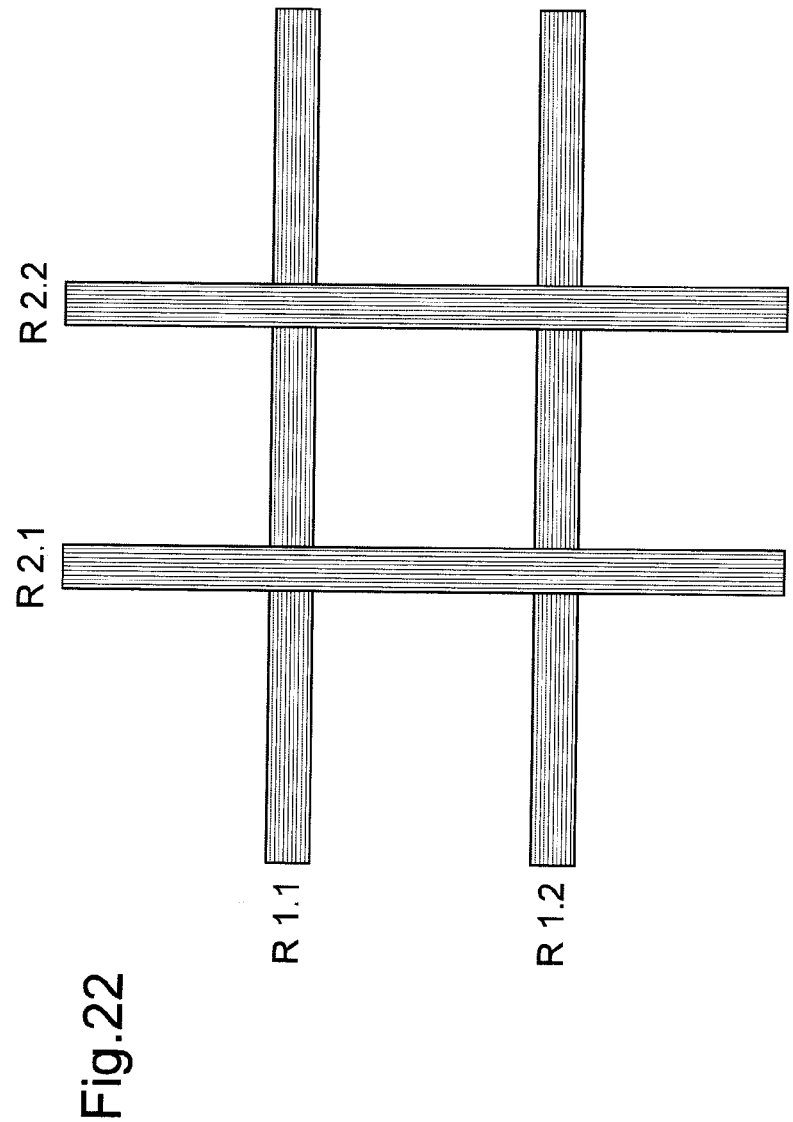
FIG. 22 shows an example of crossing to define the term "superposed layers"

FIG. 22 shows an example of crossing illustrating the definition of the term "superposed layers".

Figure 23:
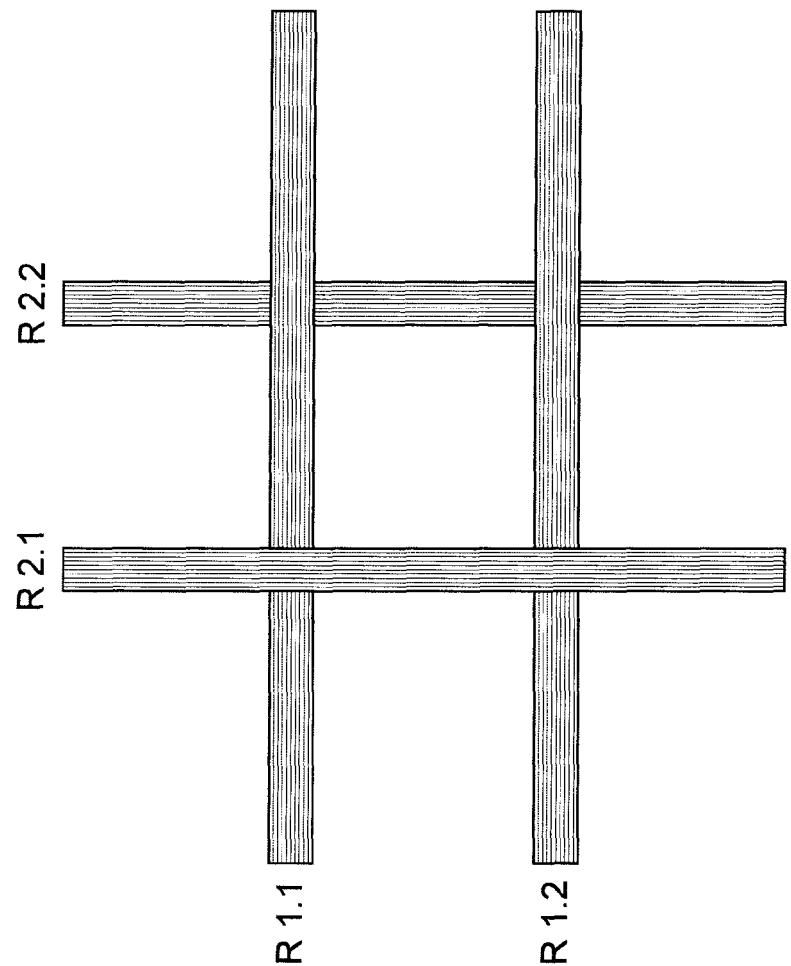
FIG. 23 shows another example of crossing to define the term "superposed layers"

FIG. 23 shows another example of crossing illustrating the definition of the term "superposed layers".

Figure 24:
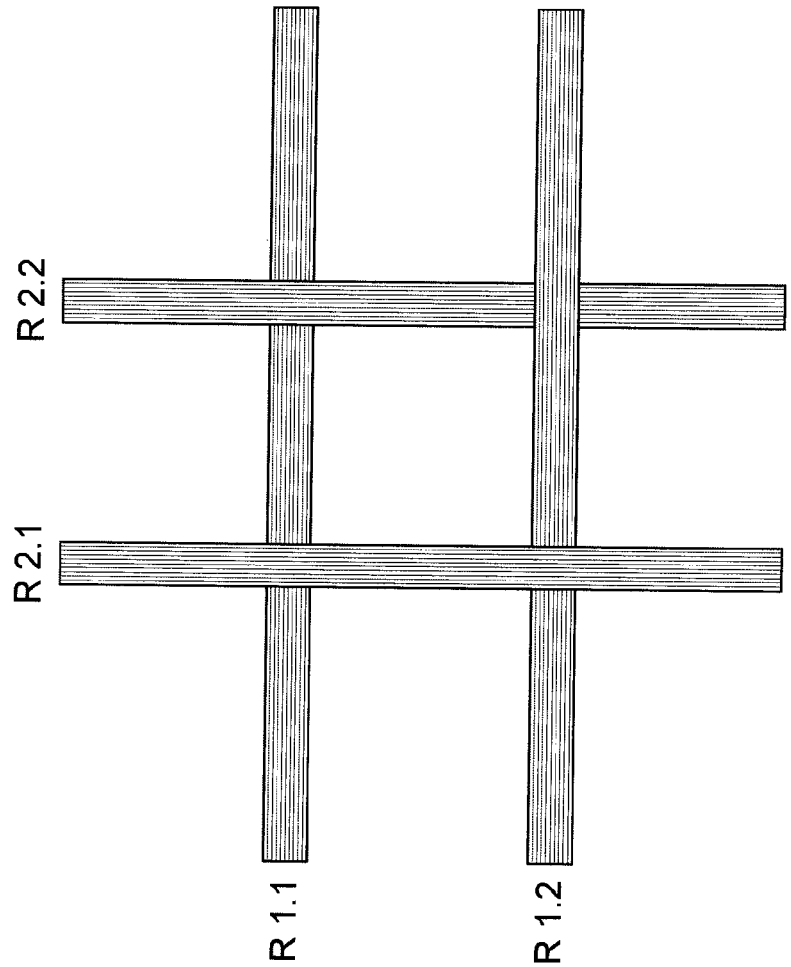
FIG. 24 shows an example of crossing to define the term "interlaced layers"

FIG. 24 shows an example of crossing to illustrate the definition of the term "interlaced layers".

Figure 25:
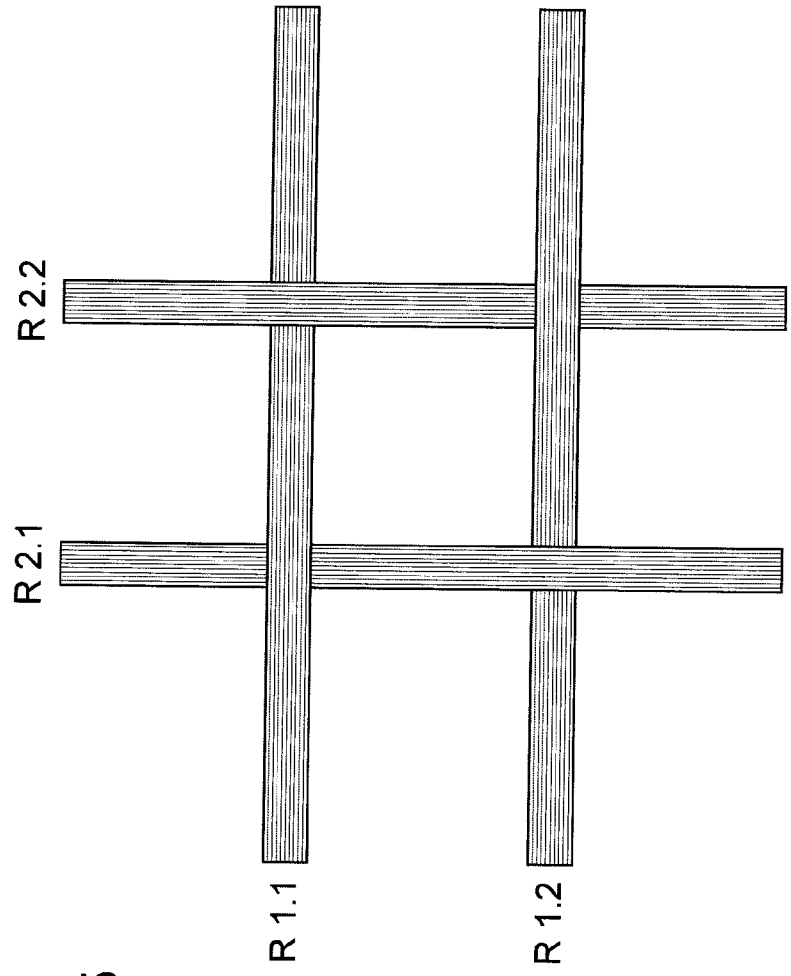
FIG. 25 shows another example of crossing to defined the term "interlaced layers"

FIG. 25 shows another example of crossing to illustrate the definition of the term "interlaced layers".

Figure 26:
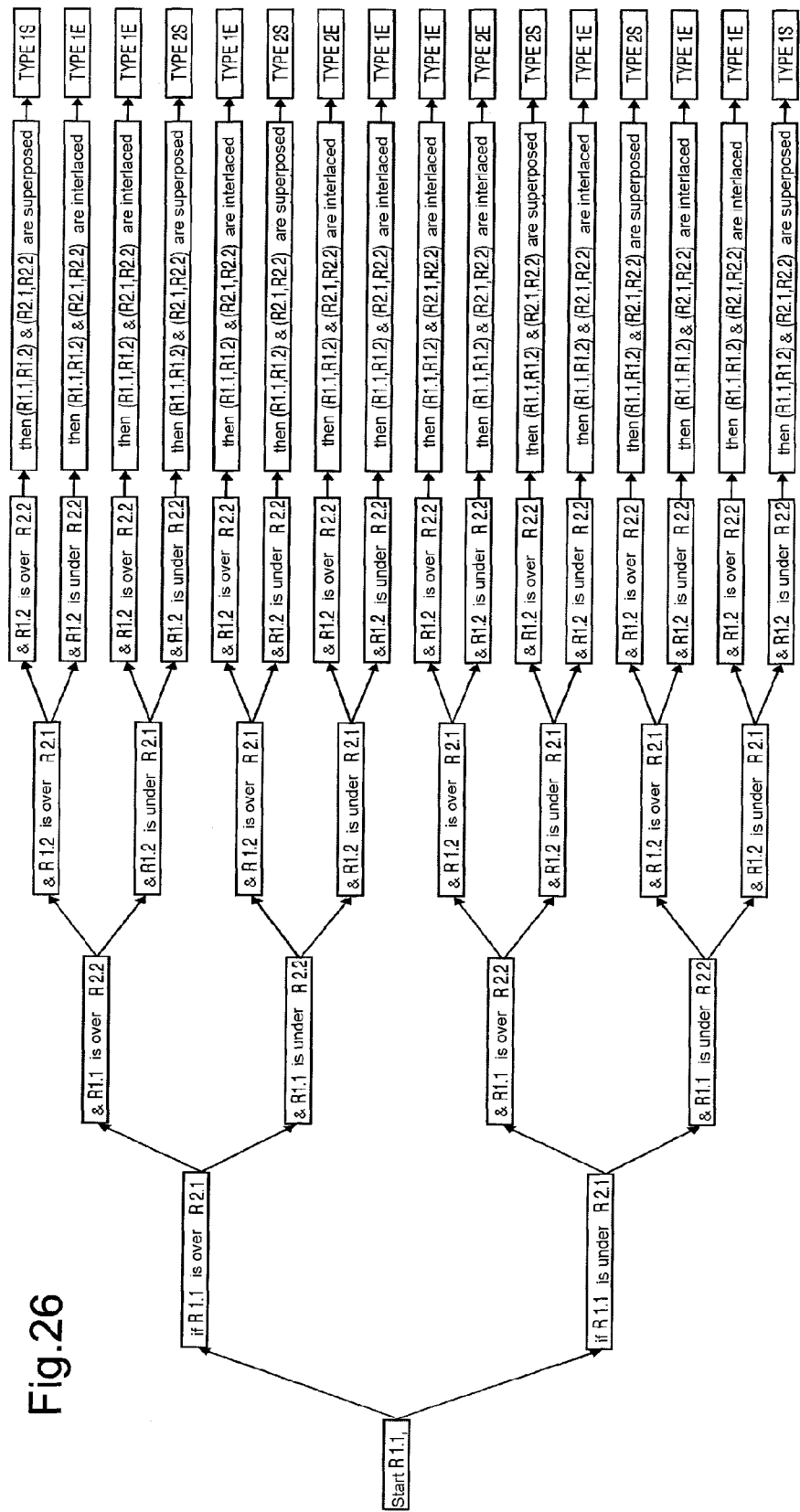
FIG. 26 is a logic diagram to define the terms "superposed layers" and "interlaced layers".

FIG. 26 is a logic diagram also serving to define the terms "superposed layers" and "interlaced layers". By definition, a sliver Ru.v over Ri.j means that the sliver Ru.v crosses the sliver Ri.j by passing over the sliver Ri.j. By definition, a sliver Ru.v under Ri.j means that the sliver Ru.v crosses the sliver Ri.j by passing under Ri.j.

It is thus possible to illustrate the definition of superposed layer configurations.

Consider a surface S that is completely or partially covered by two groups G1 and G2 of reinforcing slivers, rovings, or other similar strands. The group G1 is constituted by at least two rovings or slivers R1.1 and R1.2 that are distinct, in alignment, and parallel, touching or non-touching, and extending in a common direction D1. The group G2 is constituted by at least two rovings or slivers R2.1 and R2.2 that are distinct, in alignment, and parallel, touching or non-touching, and arranged in a common direction D2.

D1 and D2 are at a non-zero angle to each other, preferably at an angle equal to 90° in the context of this description.

If, after observing for example that R2.1 crosses and passes over R1.1 and under R1.2, it is then observed, for example, that R2.2 crosses and passes over R1.1 and also crosses and passes over R1.2, then the two groups of rovings, R1.1 & R1.2 and R2.1 & R2.2 are said to be superposed.

In order to generalize the above definition to all crossing configurations of two groups of two rovings, the logic diagram of FIG. 26 is provided on the basis of observation of FIGS. 22 and 23.

The two groups G1 and G2 are by extension constituted by layers that are said to be superposed if the above description is true for all the groups of four rovings of the same type as R1.1, R1.2, R2.1, R2.2 that are identical in the thickness of the reinforcement covering the surface S.

These crossing configurations of rovings of type 1S and 2S can be made in particular by a winding method or by a fiber-placement method.

It is also possible to illustrate the definition of interlaced layer configurations.

Consider a surface S that is completely or partially covered by two groups G1 and G2 of reinforcement comprising slivers, rovings, or other similar strands. The group G1 is constituted by at least two rovings or slivers R1.1 and R1.2 that are distinct, in alignment, and parallel, touching or non-touching, and extending in a common direction D1. The group G2 is made up of at least two rovings or slivers R2.1 and R2.2 that are distinct, in alignment, and parallel, touching or non-touching, and arranged in a common direction D2.

D1 and D2 form a non-zero angle, and preferably an angle of 90° in the context of this description.

If, after observing for example that R2.1 crosses and passes over R1.1 and crosses and passes over R1.2, it is then observed for example that R2.2 crosses and passes over R1.1 and then crosses and then passes under R1.2, then the two groups of rovings R1.1 & R1.2 and R2.1 & R2.2 are said to be interlaced.

The two groups G1 and G2 are by extension constituted by layers that are said to be interlaced if the above-described conditions are satisfied for all of the groups of four rovings of the same type as R1.1, R1.2, R2.1, R2.2 that are identifiable in the thickness of the reinforcement covering the surface S.

In order to generalize the above definitions to all crossing configurations of two groups of two rovings, there is provided the logic diagram of FIG. 26, based on observing FIGS. 24 and 25.

The interlaced roving crossing configurations of type 1E can be made in particular by a winding method or by a fiber-placement method.

The interlaced roving crossing configurations of type 2E cannot be made by a winding method or a fiber-placement method, but need to be made rather by methods such as weaving or braiding that are known as such and that are not described in greater detail in the present description.

Naturally, the present invention may be subjected to numerous variations as to its implementation. Although several embodiments and/or implementations are described, it will readily be understood that it is not conceivable to identify exhaustively all possible embodiments or implementations. It is naturally possible to envisage replacing any of the means described or any of the steps described by equivalent means or by an equivalent step, without going beyond the ambit of the present invention.

What is claimed is:

1. A method of fabricating a reinforcing coating for a rotor blade by using dry or pre-impregnated reinforcing fibers in the form of strands and laying said strands in layers on the rotor blade, the method comprising the steps of:

providing a rotor blade having a pressure surface, a suction surface, a blade span, and a longitudinal axis oriented along the span;

using a first layer of longitudinal strands and a second layer of longitudinal strands, locating an origin portion of the rotor blade to constitute the origin of strand laying, determining placement directions for laying strands in each of the first and second layers using an angular orientation for the strands of each layer of ±45° relative to the longitudinal axis, determining an order for laying each of the strands in each of the placement directions in order to define at least one crossing line of the strands, the crossing line comprising a boundary such that on a first side of the crossing line the strands in the first layer are disposed above the strands in the second layer and on a second side of the crossing line the strands in the second layer are disposed above the strands in the first layer, determining a number of laying operations for the first layer and the second layer using a predefined number of strands for each laying operation and a pitch for the strands laid during each laying operation, and then superposing or interlacing the strands of two successive laying operations on the rotor blade in order to reconstitute the first and second layers in the form of a pattern with a single crossing line along the pressure surface or the suction surface, the crossing line being a jagged line defined by corners of alternating strands of the first and second layers.

2. A method according to claim 1, wherein the strands comprise slivers or rovings of width lying in the range 6.35 mm to 100 mm, of thickness lying in the range 0.2 mm to 0.4 mm, and of length lying in the range 100 mm to 1000 mm.

3. A method according to claim 1, wherein the method provides for making the strands by using dry or pre-impregnated tapes, rovings, or fibers of glass, aramid, basalt, carbon, or natural fibers of flax, hemp, cotton, or silk.

4. A method according to claim 1, wherein the method provides for superposing the strands of the two layers by selecting a pitch equal to a determined number of sliver widths, which number may optionally be an integer.

5. A method according to claim 1, wherein the method provides for interlacing the strands of the two layers by selecting a pitch equal to a determined integer number of the width of the strands.

6. A method according to claim 1, wherein the method provides for simultaneously interlacing a number "x" of strands of the first layer with a number "x" of strands of the second layer, said strands of the first and second layers presenting a pitch equal to a number "y".

7. A method according to claim 6, wherein the method provides for simultaneously interlacing four strands of the first layer with four strands of the second layer, said strands presenting a pitch equal to 2.

8. A method according to claim 1, wherein interlacing the strands comprises selecting an offset for the plurality of layers in order to limit losses of stiffness strength in the reinforcing coatings of the composite material part.

9. A rotor blade including a reinforced coating made by a method of fabricating the reinforcing coating for a composite material part by using dry or pre-impregnated reinforcing fibers in the form of strands and laying said strands in layers by being placed on a solid body or coating with a reinforcement for the part, the method comprising the steps of:

providing a solid body for covering, the solid body having a first surface and a longitudinal axis, using two layers of longitudinal strands, locating an origin portion of the solid body for covering to constitute the origin of sliver laying, the two layers comprising a first layer and a second layer, determining placement directions for laying strands in each of the layers relative to a determined direction of the solid body for covering, determining an order for laying each of the strands in each of the placement directions in order to define at least one crossing line of the strands, the crossing line comprising a boundary such that on a first side of the crossing line the strands in the first layer are disposed above the strands in the second layer and on a second side of the crossing line the strands in the second layer are disposed above the strands in the first layer, determining a number of laying operations for the two layers using a predefined number of strands for each laying operation and a pitch for the strands laid during each laying operation, and then interlacing the strands of two successive laying operations, the laying operations being performed on the solid body in order to reconstitute the two layers with said at least one crossing line in the form of at least one particular pattern, using an angular orientation for the strands of each layer respectively of 0° and some other arbitrary angle relative to said determined direction of the solid body for covering, and an interlaced pattern type being selected such that the number of layer crossing lines along the first surface of the solid body for covering is a single line, the crossing line being a jagged line defined by corners of alternating strands of the first and second layers, to form a rotor blade having the single crossing line on the first surface.

10. A blade for the main rotor of a rotorcraft or a helicopter, the blade including a reinforced coating made by a method of fabricating the reinforcing coating for a composite material part by using dry or pre-impregnated reinforcing fibers in the form of strands and laying said strands in layers by being placed on a solid body or coating with a reinforcement for the part, the method comprising the steps of:

providing a solid body for covering, the solid body having a first surface and a longitudinal axis, using two layers of longitudinal strands, locating an origin portion of the solid body for covering to constitute the origin of sliver laying, the two layers comprising a first layer and a second layer, determining placement directions for laying strands in each of the layers relative to a determined direction of the solid body for covering, determining an order for laying each of the strands in each of the placement directions in order to define at least one crossing line of the strands, the crossing line comprising a boundary such that on a first side of the crossing line the strands in the first layer are disposed above the strands in the second layer and on a second side of the crossing line the strands in the second layer are disposed above the strands in the first layer, determining a number of laying operations for the two layers using a predefined number of strands for each laying operation and a pitch for the strands laid during each laying operation, and then interlacing the strands of two successive laying operations, the laying operations being performed on the solid body in order to reconstitute the two layers with said at least one crossing line in the form of at least one particular pattern, using an angular orientation for the strands of each layer respectively of 0° and some other arbitrary angle relative to said determined direction of the solid body for covering, and an interlaced pattern type being selected such that the number of layer crossing lines along the first surface of the solid body for covering is a single line, the crossing line being a jagged line defined by corners of alternating strands of the first and second layers, to form a blade having the single crossing line on the first surface.

11. A blade for an anti-torque rotor of a rotorcraft or a helicopter, including a reinforced covering made by a method of fabricating the reinforced covering for a composite material part by using dry or pre-impregnated reinforcing fibers in the form of strands and laying said strands in layers by being placed on a solid body or coating with a reinforcement for the part, the method comprising the steps of:

providing a solid body for covering, the solid body having a first surface and a longitudinal axis, using two layers of longitudinal strands, locating an origin portion of the solid body for covering to constitute the origin of sliver laying, the two layers comprising a first layer and a second layer, determining placement directions for laying strands in each of the layers relative to a determined direction of the solid body for covering, determining an order for laying each of the strands in each of the placement directions in order to define at least one crossing line of the strands, the crossing line comprising a boundary such that on a first side of the crossing line the strands in the first layer are disposed above the strands in the second layer and on a second side of the crossing line the strands in the second layer are disposed above the strands in the first layer, determining a number of laying operations for the two layers using a predefined number of strands for each laying operation and a pitch for the strands laid during each laying operation, and then interlacing the strands of two successive laying operations, the laying operations being performed on the solid body in order to reconstitute the two layers with said at least one crossing line in the form of at least one particular pattern, using an angular orientation for the strands of each layer respectively of 0° and some other arbitrary angle relative to said determined direction of the solid body for covering, and an interlaced pattern type being selected for forming the interlacing patterns such that the number of layer crossing lines along the first surface of the solid body for covering is a single line, the crossing line being a jagged line defined by corners of alternating strands of the first and second layers, to form a blade having the single crossing line on the first surface.

12. A method of fabricating a reinforcing coating for a rotor blade, the method comprising:

providing a rotor blade having an upper surface, a lower surface, and a longitudinal axis;

selecting first and second layers of reinforcing fibers for covering the rotor blade;

selecting a pattern for the first and second layers of longitudinal strands, the pattern having at least one crossing line where strands in the first layer cross strands in the second layer, the crossing line being defined by a boundary such that on a first side of the crossing line the strands in the first layer are disposed above the strands in the second layer and on a second side of the crossing line the strands in the second layer are disposed above the strands in the first layer;

selecting a first angular orientation for the first layer of strands relative to the longitudinal axis and a second angular orientation for the second layer of strands relative to the longitudinal axis;

selecting an origin on the rotor blade from which to begin strand laying operations such that on at least one of the upper surface and lower surface only a single crossing line is defined, the crossing line being a jagged line defined by corners of alternating strands of the first and second layers;

determining a number of strand laying operations for the first and second layers using a predefined number of strands and pitch for the strands for each laying operation; and interlacing the strands of successive laying operations to reconstitute the pattern on the rotor blade.

13. The method of claim 12, wherein the first and second angular orientations define a 90° angle relative to each other.

14. The method of claim 12, wherein selecting a first angular orientation and a second angular orientation includes selecting first and second angular orientations to take up centrifugal and bending forces in the solid body.

15. The method of claim 12, wherein the first and second angular orientations are ±45° relative to the longitudinal axis.

16. The method of claim 12, wherein the solid body is a rotor blade and the longitudinal axis extends along a span of the rotor blade.

17. The method of claim 12, wherein interlacing the strands of successive laying operations comprises using a fiber placement method.

* * * * *